US010630419B2

(12) United States Patent
Wang et al.

(10) Patent No.: US 10,630,419 B2
(45) Date of Patent: Apr. 21, 2020

(54) RECEIVER AND DATA RECEIVING METHOD

(71) Applicant: HUAWEI TECHNOLOGIES CO., LTD., Shenzhen, Guangdong (CN)

(72) Inventors: Xie Wang, Shenzhen (CN); Yuanda Huang, Dongguan (CN); Liangchuan Li, Dongguan (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/398,169

(22) Filed: Apr. 29, 2019

(65) Prior Publication Data
US 2019/0253177 A1    Aug. 15, 2019

Related U.S. Application Data

(63) Continuation of application No. PCT/CN2016/104153, filed on Oct. 31, 2016.

(51) Int. Cl.
*H04J 14/06*      (2006.01)
*H04B 10/2569*      (2013.01)
(Continued)

(52) U.S. Cl.
CPC .............. *H04J 14/06* (2013.01); *H04B 7/10* (2013.01); *H04B 10/2507* (2013.01);
(Continued)

(58) Field of Classification Search
CPC ...... H04J 14/06; H04J 14/005; H04J 14/0238; H04J 14/0282; H04B 7/10;
(Continued)

(56) References Cited

U.S. PATENT DOCUMENTS 7,248,841 B2 * 7/2007 Agee .................... H04B 7/0417
                                                  455/101
8,315,327 B2 * 11/2012 Agee .................... H04B 7/0413
                                                  375/267
(Continued)

FOREIGN PATENT DOCUMENTS

| CN | 1296684 A | 5/2001 |
|---|---|---|
| CN | 1571306 A | 1/2005 |

(Continued)

OTHER PUBLICATIONS

Hao Yao-hong et al: "Study on PMD for coherent optical orthogonal frequency division multiplexing system", Feb. 2013, total 6 pages.

*Primary Examiner* — Abbas H Alagheband
(74) *Attorney, Agent, or Firm* — Womble Bond Dickinson (US) LLP

(57) ABSTRACT

Embodiments of the present invention provide a receiver and a data receiving method. The receiver includes: two first input ends, configured to receive a digital signal of an X-polarization state and a digital signal of a Y-polarization state; a despreading module, configured to despread the digital signal of the X-polarization state and the digital signal of the Y-polarization state based on N delay values and spreading codes of N transmitters, to obtain N first baseband signals and N second baseband signals; and a multiple-input multiple-output equalization module, configured to perform equalization filtering processing on the N first baseband signals and the N second baseband signals, to obtain recovered data of the first polarization states and recovered data of the second polarization states of the N transmitters. In the embodiments of the present invention, the coherent CDMA multipoint-to-point data transmission in an optical communications system is implemented.

17 Claims, 10 Drawing Sheets

(51) Int. Cl.

| | | |
|---|---|---|
| *H04J 14/02* | (2006.01) | |
| *H04B 7/10* | (2017.01) | |
| *H04J 14/00* | (2006.01) | |
| *H04B 10/61* | (2013.01) | |
| *H04B 10/2507* | (2013.01) | |
| *H04B 7/0426* | (2017.01) | |
| *H04B 7/0456* | (2017.01) | |
| *H04L 5/00* | (2006.01) | |

(52) U.S. Cl.
CPC ....... *H04B 10/2569* (2013.01); *H04B 10/614* (2013.01); *H04J 14/005* (2013.01); *H04J 14/0238* (2013.01); *H04J 14/0282* (2013.01); *H04B 7/0443* (2013.01); *H04B 7/0465* (2013.01); *H04L 5/0051* (2013.01)

(58) Field of Classification Search
CPC ............ H04B 10/2507; H04B 10/2569; H04B 10/614; H04B 7/0417; H04B 7/0443; H04B 7/0465; H03C 7/02; H04W 16/14; H04W 52/42
USPC .......................................................... 398/65
See application file for complete search history.

(56) References Cited

U.S. PATENT DOCUMENTS

| | | | | |
|---|---|---|---|---|
| 8,699,882 | B2* | 4/2014 | Shieh ................. | H04L 25/0224 398/152 |
| 8,805,208 | B2 | 8/2014 | Zhang et al. | |
| 8,995,844 | B2* | 3/2015 | Schemmann ...... | H04B 10/2513 375/271 |
| 9,042,474 | B2* | 5/2015 | Chen .................... | H04B 7/0417 375/259 |
| 9,112,608 | B2* | 8/2015 | Bai ...................... | H04B 10/532 |
| 9,191,120 | B2* | 11/2015 | Zhou .................... | H04B 10/516 |
| 10,116,404 | B2* | 10/2018 | Nazarathy ........... | H04J 11/0023 |
| 2002/0089718 | A1 | 7/2002 | Penninckx et al. | |
| 2004/0202480 | A1* | 10/2004 | Weid ..................... | G02B 6/274 398/147 |
| 2006/0263094 | A1 | 11/2006 | Setti et al. | |
| 2009/0110033 | A1 | 4/2009 | Shattil | |
| 2012/0183303 | A1 | 7/2012 | Onohara et al. | |
| 2012/0269513 | A1* | 10/2012 | Abe ..................... | H04B 10/532 398/65 |
| 2013/0136451 | A1* | 5/2013 | Yoshida .............. | H04B 10/532 398/65 |
| 2013/0287393 | A1 | 10/2013 | Morie et al. | |
| 2014/0050476 | A1* | 2/2014 | Grigoryan .......... | H04B 10/2572 398/65 |
| 2014/0321566 | A1* | 10/2014 | Wu ......................... | H04B 7/10 375/267 |
| 2016/0164647 | A1* | 6/2016 | Agee .................... | H04B 7/0413 375/267 |
| 2016/0204913 | A1* | 7/2016 | Agee .................... | H04B 7/0413 375/267 |
| 2016/0352419 | A1* | 12/2016 | Fonseka ............. | H04B 10/0793 |
| 2018/0227056 | A1* | 8/2018 | Nakashima ........ | H04B 10/2557 |
| 2018/0294848 | A1* | 10/2018 | Park ..................... | H04B 7/0417 |

FOREIGN PATENT DOCUMENTS

| | | |
|---|---|---|
| CN | 1633764 A | 6/2005 |
| CN | 1759549 A | 4/2006 |
| CN | 101729187 A | 6/2010 |
| CN | 102170312 A | 8/2011 |
| CN | 102318241 A | 1/2012 |
| CN | 102577177 A | 7/2012 |
| CN | 103141037 A | 6/2013 |
| CN | 103368603 A | 10/2013 |
| WO | 0227994 A1 | 4/2002 |
| WO | 2015104058 A1 | 7/2015 |

* cited by examiner

RECEIVER AND DATA RECEIVING METHOD

CROSS-REFERENCE TO RELATED APPLICATIONS

This application is a continuation of International Application No. PCT/CN2016/104153, filed on Oct. 31, 2016, the disclosure of which is herein incorporated by reference in its entirety.

TECHNICAL FIELD

Embodiments of the present invention relate to communications technologies, and in particular, to a receiver and a data receiving method.

BACKGROUND

In a high-speed optical network system, an optical multiplexing transmission technology in which optical signals of a plurality of channels are multiplexed by using one fiber is often used. In an existing optical multiplexing transmission technology, a main multiplexing technology includes time division multiplexing (TDM), wavelength division multiplexing (WDM), frequency division multiplexing (FDM), orthogonal frequency division multiplexing (OFDM), or code division multiplexing (CDM). In the foregoing multiplexing technology, the CDM can multiplex a plurality of signals in one timeslot and one wavelength, providing a high degree of multiplexing. Coherent Code Division Multiple Access (CDMA) is an important implementation in an optical communications multipoint-to-point system. A coherent CDMA system is compatible with an existing commercial coherent component. In a network architecture based on coherent CDMA, service sites send corresponding data on a same wavelength resource by using respective spreading codes. The spreading codes used by the service sites are mutually orthogonal. This ensures that a coherent receiver at a backbone node can recover data of the service sites by using different spreading codes. Therefore, the coherent receiver at the backbone node needs to use a corresponding digital signal processing (DSP) receiving method.

However, a current DSP architecture of the coherent receiver is only applicable to a point to point transmission system, and is not applicable to a coherent CDMA multipoint-to-point system. Moreover, due to a difference between transmission channels, a CDMA architecture in wireless communication cannot be completely applicable to an optical communications system either. In addition, in the coherent CDMA optical communications system, a transmission signal used by each user is a dual-polarization signal. Because a transmission channel is a fiber, effects such as polarization mode dispersion (PMD) and differential group delay (DGD) are caused, thereby affecting a CDMA signal.

SUMMARY

Embodiments of the present invention provide a receiver and a data receiving method, to implement coherent CDMA multipoint-to-point data transmission in an optical communications system.

According to a first aspect, an embodiment of the present invention provides a receiver, including:

two first input ends, a despreading module, a multiple-input multiple-output equalization module, and 2N first output ends, where the two first input ends are connected to the despreading module, and the despreading module is connected to the multiple-input multiple-output equalization module;

the two first input ends are configured to respectively receive a digital signal of an X-polarization state and a digital signal of a Y-polarization state;

the despreading module is configured to despread the digital signal of the X-polarization state and the digital signal of the Y-polarization state separately based on N delay values and spreading codes of N transmitters, to obtain N first baseband signals and N second baseband signals, where each first baseband signal includes a first baseband signal of the X-polarization state and a first baseband signal of the Y-polarization state, each second baseband signal includes a second baseband signal of the X-polarization state and a second baseband signal of the Y-polarization state, and the N delay values are respectively determined based on differences between synchronization positions of first polarization states and synchronization positions of second polarization states of the N transmitters;

the multiple-input multiple-output equalization module is configured to perform equalization filtering processing on the N first baseband signals and the N second baseband signals, to obtain recovered data of the first polarization states and recovered data of the second polarization states of the N transmitters; and the 2N first output ends each are configured to output recovered data of one polarization state of one transmitter, where N is a positive integer greater than or equal to 1.

In this embodiment, the receiver synchronizes and despreads the received digital signal of the X-polarization state and the received digital signal of the Y-polarization state respectively based on the first polarization state and the second polarization state of each transmitter, to obtain recovered data of first polarization states and recovered data of second polarization states of different transmitters, and implement receiving of data of dual polarization states of a plurality of transmitters, that is, implement coherent CDMA multipoint-to-point data transmission in an optical communications system. In addition, in a process of obtaining data of the first polarization states and the second polarization states of the different transmitters, a DGD effect on a fiber channel can be effectively compensated for, thereby effectively improving data transmission quality.

With reference to the first aspect, in a possible implementation of the first aspect, the despreading module includes a first despreading module and a second despreading module, and the first despreading module and the second despreading module each include two input ends and 2N output ends;

the two input ends of the first despreading module and the two input ends of the second despreading module are separately connected to the two first input ends;

the 2N output ends of the first despreading module and the 2N output ends of the second despreading module are separately connected to one second output end;

the first despreading module is configured to output the N first baseband signals, and the second despreading module is configured to output the N second baseband signals; and one output end of the first despreading module is configured to output a first baseband signal of the X-polarization state of one transmitter or a first baseband signal of the Y-polarization state of one transmitter, and one output end of the second despreading module is configured to output a second baseband signal of the X-polarization state of one transmitter or a second baseband signal of the Y-polarization state of one transmitter.

With reference to the first aspect, in another embodiment, the despreading module further includes a first polarization state synchronization module and a second polarization state synchronization module;

the first polarization state synchronization module is configured to determine the synchronization positions of the first polarization states of the N transmitters based on training sequences of the first polarization states of the N transmitters, the digital signal of the X-polarization state, and the digital signal of the Y-polarization state; and the second polarization state synchronization module is configured to determine the synchronization positions of the second polarization states of the N transmitters based on training sequences of the second polarization states of the N transmitters, the digital signal of the X-polarization state, and the digital signal of the Y-polarization state.

With reference to the first aspect or any possible implementation of the first aspect, in another possible implementation of the first aspect, the despreading module further includes an adjustable delay module, the adjustable delay module is disposed between the two first input ends and the first despreading module, and the adjustable delay module is further connected to the first polarization state synchronization module and the second polarization state synchronization module;

the adjustable delay module is configured to: determine delay values of the N transmitters based on the differences between the synchronization positions of the first polarization states of the N transmitters and the synchronization positions of the second polarization states of the N transmitters, perform delay processing on the digital signal of the X-polarization state and the digital signal of the Y-polarization state separately based on the delay values of the N transmitters to obtain N delayed digital signals of the X-polarization state and N delayed digital signals of the Y-polarization state, and output the N delayed digital signals of the X-polarization state and the N delayed digital signals of the Y-polarization state to the first despreading module; and the first despreading module despreads the N delayed digital signals of the X-polarization state and the N delayed digital signals of the Y-polarization state respectively by using the spreading codes of the N transmitters, to obtain the N first baseband signals.

In this embodiment, in the receiver, the adjustable delay module is disposed between the first input ends and the first despreading module. The N delay values of the adjustable delay module are respectively determined based on differences between the synchronization positions of the first polarization states and the synchronization positions of the second polarization states of the N transmitters, to synchronize and despread received to-be-processed digital signals of two polarization states, and effectively reduce DGD effects generated by different polarization state components when a data signal is transmitted in a fiber.

With reference to the first aspect, in another embodiment, the despreading module further includes an adjustable delay module, the adjustable delay module is disposed between the two first input ends and the second despreading module, and the adjustable delay module is further connected to the first polarization state synchronization module and the second polarization state synchronization module;

the adjustable delay module is configured to: determine delay values of the N transmitters based on the differences between the synchronization positions of the first polarization states of the N transmitters and the synchronization positions of the second polarization states of the N transmitters, perform delay processing on the digital signal of the X-polarization state and the digital signal of the Y-polarization state respectively based on the delay values of the N transmitters to obtain N delayed digital signals of the X-polarization state and N delayed digital signals of the Y-polarization state, and output the N delayed digital signals of the X-polarization state and the N delayed digital signals of the Y-polarization state to the second despreading module; and the second despreading module despreads the N delayed digital signals of the X-polarization state and the N delayed digital signals of the Y-polarization state respectively by using the spreading codes of the N transmitters, to obtain the N second baseband signals.

In this embodiment, in the receiver, the adjustable delay module is disposed between the first input ends and the second despreading module. The N delay values of the adjustable delay module are determined based on the synchronization positions of the first polarization states and the synchronization positions of the second polarization states of the N transmitters, to synchronize and despread received to-be-processed digital signals of two polarization states, and effectively reduce DGD effects generated by different polarization state components when a data signal is transmitted in a fiber.

With reference to the first aspect, in another embodiment, the despreading module further includes N adjustable delay modules, the first despreading module includes N first despreading submodules, the N adjustable delay modules each are disposed in one first despreading submodule, and one first despreading submodule is configured to output a first baseband signal of the X-polarization state and a first baseband signal of the Y-polarization state of one transmitter;

each adjustable delay module determines a delay value of one transmitter based on a difference between a synchronization position of a first polarization state of the transmitter and a synchronization position of a second polarization state of the transmitter, performs delay processing on a spreading code of the transmitter based on the delay value of the transmitter to obtain a delayed spreading code of the transmitter, and outputs the delayed spreading code of the transmitter to a first despreading submodule corresponding to the spreading code; and each first despreading submodule is configured to despread the digital signal of the X-polarization state and the digital signal of the Y-polarization state by using a delayed spreading code of a transmitter, to obtain a first baseband signal.

In this embodiment, in the receiver, an adjustable delay module is disposed in each first despreading submodule in the first despreading module. A delay value of each adjustable delay module is determined based on a difference between a synchronization position of a first polarization state and a synchronization position of a second polarization state of a transmitter corresponding to the adjustable delay module, to synchronize and despread received to-be-processed digital signals of two polarization states, and effectively reduce DGD effects generated by different polarization state components when a data signal is transmitted in a fiber.

With reference to the first aspect, in another embodiment, the despreading module further includes N adjustable delay modules, the second despreading module includes N second despreading submodules, the N adjustable delay modules each are disposed in one second despreading submodule, and one second despreading submodule is configured to output a second baseband signal of the X-polarization state and a second baseband signal of the Y-polarization state of one transmitter;

each adjustable delay module determines a delay value of one transmitter based on a difference between a synchronization position of a first polarization state of the transmitter and a synchronization position of a second polarization state of the transmitter, performs delay processing on a spreading code of the transmitter based on the delay value of the transmitter to obtain a delayed spreading code of the transmitter, and outputs the delayed spreading code of the transmitter to a second despreading submodule corresponding to the spreading code; and each second despreading submodule is configured to despread the digital signal of the X-polarization state and the digital signal of the Y-polarization state by using a delayed spreading code of one transmitter, to obtain one second baseband signal.

In this embodiment, in the receiver, an adjustable delay module is disposed in each second despreading submodule in the second despreading module. A delay value of each adjustable delay module is determined based on a difference between a synchronization position of a first polarization state and a synchronization position of a second polarization state of a transmitter corresponding to the adjustable delay module, to synchronize and despread received to-be-processed digital signals of two polarization states, and effectively reduce DGD effects generated by different polarization state components when a data signal is transmitted in a fiber.

With reference to the first aspect, in another embodiment, the multiple-input multiple-output equalization module includes a first multiple-input multiple-output equalization module, a second multiple-input multiple-output equalization module, and a summation module;

the first multiple-input multiple-output equalization module is connected to the 2N output ends of the first despreading module, and the second multiple-input multiple-output equalization module is connected to the 2N output ends of the second despreading module;

the first multiple-input multiple-output equalization module includes 2N third output ends, and the second multiple-input multiple-output equalization module includes 2N fourth output ends;

the 2N third output ends are connected to the 2N fourth output ends and the summation module, and the summation module is connected to the 2N first output ends;

the first multiple-input multiple-output equalization module is configured to process the N first baseband signals based on 2N*2N filtering coefficients, to obtain first modulation data of the N transmitters, where the first modulation data of each transmitter includes first modulation data of the first polarization state and first modulation data of the second polarization state of the transmitter;

the second multiple-input multiple-output equalization module is configured to process the N second baseband signals based on the 2N*2N filtering coefficients, to obtain second modulation data of the N transmitters, where the second modulation data of each transmitter includes second modulation data of the first polarization state and second modulation data of the second polarization state of the transmitter; and the summation module is configured to sum the first modulation data and the second modulation data of the N transmitters up, to obtain the recovered data of the first polarization states and the recovered data of the second polarization states of the N transmitters.

With reference to the first aspect, in another embodiment, the first multiple-input multiple-output equalization module includes 2N*2N first equalization submodules, and one filtering coefficient is set for each first equalization submodule;

the 2N columns of first equalization submodules are separately connected to one output end of the first despreading module, and the 2N rows of first equalization submodules are separately connected to one third output end by using 2N−1 adders;

the second multiple-input multiple-output equalization module includes 2N*2N second equalization submodules, and one filtering coefficient is set for each second equalization submodule; and the 2N columns of second equalization submodules are separately connected to one output end of the second despreading module, and the 2N rows of second equalization submodules are separately connected to one fourth output end by using the 2N−1 adders.

In this embodiment, the receiver respectively compensates, for a channel loss by using two multiple-input multiple-output equalization modules, the first baseband signals and the second baseband signals that are obtained through despreading, thereby effectively compensating for a DGD loss on a fiber channel, and further, improving data transmission performance.

With reference to the first aspect, in another embodiment, the multiple-input multiple-output equalization module includes 2N Multiple-input single-output equalization modules;

each Multiple-input single-output equalization module is connected to the 2N output ends of the first despreading module and the 2N output ends of the second despreading module; and the 2N Multiple-input single-output equalization modules process the N first baseband signals and the N second baseband signals each by using one transmitter as a reference, to obtain recovered data of one polarization state of a corresponding transmitter.

In this embodiment, the receiver compensates, for a channel loss by using the 2N Multiple-input single-output equalization modules, the first baseband signals and the second baseband signals respectively that are obtained through despreading, thereby effectively compensating for a DGD loss on a fiber channel, and further, improving data transmission performance. This embodiment is more applicable to an application scenario in which a frequency offset between transmitters is relatively large.

With reference to the first aspect, in another embodiment, the receiver further includes 2N carrier recovery modules, the 2N carrier recovery modules each are disposed at one first output end, and each carrier recovery module is configured to perform carrier phase recovery on recovered data of a polarization state of a transmitter corresponding to the carrier recovery module, to obtain original data of one polarization state of the transmitter corresponding to the carrier recovery module.

According to a second aspect, an embodiment of the present invention provides a data receiving method, including:

receiving a digital signal of an X-polarization state and a digital signal of a Y-polarization state;

determining N delay values based on differences between synchronization positions of first polarization states and synchronization positions of second polarization states of N transmitters;

despreading the digital signal of the X-polarization state and the digital signal of the Y-polarization state based on the N delay values and spreading codes of the N transmitters, to obtain N first baseband signals and N second baseband signals, where each first baseband signal includes a first baseband signal of the X-polarization state and a first baseband signal of the Y-polarization state, and each second baseband signal includes a second baseband signal of the X-polarization state and a second baseband signal of the Y-polarization state; and performing equalization filtering processing on the N first baseband signals and the N second baseband signals, to obtain recovered data of the first polarization states and recovered data of the second polarization states of the N transmitters, where a value of N is the same as a quantity of transmitters.

With reference to the second aspect, in one embodiment, the despreading the digital signal of the X-polarization state and the digital signal of the Y-polarization state based on the N delay values and spreading codes of the N transmitters, to obtain N first baseband signals and N second baseband signals includes:

despreading the digital signal of the X-polarization state and the digital signal of the Y-polarization state separately by using the spreading codes of the N transmitters, to obtain the N second baseband signals;

performing delay processing on the digital signal of the X-polarization state and the digital signal of the Y-polarization state based on the N delay values, to obtain N delayed digital signals of the X-polarization state and N delayed digital signals of the Y-polarization state; and despreading the N delayed digital signals of the X-polarization state and the N delayed digital signals of the Y-polarization state respectively by using the spreading codes of the N transmitters, to obtain the N first baseband signals.

With reference to the second aspect, in one embodiment, the despreading the digital signal of the X-polarization state and the digital signal of the Y-polarization state based on the N delay values and spreading codes of the N transmitters, to obtain N first baseband signals and N second baseband signals includes:

despreading the digital signal of the X-polarization state and the digital signal of the Y-polarization state separately by using the spreading codes of the N transmitters, to obtain the N first baseband signals;

performing delay processing on the digital signal of the X-polarization state and the digital signal of the Y-polarization state based on the N delay values, to obtain N delayed digital signals of the X-polarization state and N delayed digital signals of the Y-polarization state; and despreading the N delayed digital signals of the X-polarization state and the N delayed digital signals of the Y-polarization state respectively by using the spreading codes of the N transmitters, to obtain the N second baseband signals.

With reference to the second aspect, in another embodiment, the despreading the digital signal of the X-polarization state and the digital signal of the Y-polarization state based on the N delay values and spreading codes of the N transmitters, to obtain N first baseband signals and N second baseband signals includes:

despreading the digital signal of the X-polarization state and the digital signal of the Y-polarization state separately by using the spreading codes of the N transmitters, to obtain the N second baseband signals;

performing delay processing on the spreading codes of the N transmitters based on the N delay values, to obtain N delayed spreading codes; and despreading the digital signal of the X-polarization state and the digital signal of the Y-polarization state separately by using the N delayed spreading codes, to obtain the N first baseband signals.

With reference to the second aspect, in embodiment, the despreading the digital signal of the X-polarization state and the digital signal of the Y-polarization state based on the N delay values and spreading codes of the N transmitters, to obtain N first baseband signals and N second baseband signals includes:

despreading the digital signal of the X-polarization state and the digital signal of the Y-polarization state separately by using the spreading codes of the N transmitters, to obtain the N first baseband signals;

performing delay processing on the spreading codes of the N transmitters based on the N delay values, to obtain N delayed spreading codes; and despreading the digital signal of the X-polarization state and the digital signal of the Y-polarization state separately by using the N delayed spreading codes, to obtain the N second baseband signals.

With reference to the second aspect, in another embodiment, the method further includes:

determining the synchronization positions of the first polarization states of the N transmitters based on training sequences of the first polarization states of the N transmitters, the digital signal of the X-polarization state, and the digital signal of the Y-polarization state; and determining the synchronization positions of the second polarization states of the N transmitters based on training sequences of the second polarization states of the N transmitters, the digital signal of the X-polarization state, and the digital signal of the Y-polarization state.

With reference to the second aspect, in another embodiment, the performing equalization filtering processing on the N first baseband signals and the N second baseband signals, to obtain recovered data of the first polarization states and recovered data of the second polarization states of the N transmitters includes:

processing the N first baseband signals based on 2N*2N filtering coefficients, to obtain first modulation data of the N transmitters, where the first modulation data of each transmitter includes first modulation data of the first polarization state and first modulation data of the second polarization state of the transmitter;

processing the N second baseband signals based on the 2N*2N filtering coefficients, to obtain second modulation data of the N transmitters, where the second modulation data of each transmitter includes second modulation data of the first polarization state and second modulation data of the second polarization state of the transmitter; and summing the first modulation data and the second modulation data of the N transmitters up, to obtain the recovered data of the first polarization states and the recovered data of the second polarization states of the N transmitters.

For beneficial effects of the data receiving method provided in any one of the second aspect and the embodiments of the second aspect, refer to beneficial effects of any one of the first aspect and the embodiments of the first aspect. Details are not described herein again.

According to the receiver and the data receiving method in the embodiments of the present invention, the receiver receives the digital signal of the X-polarization state and the digital signal of the Y-polarization state; and despreads the digital signal of the X-polarization state and the digital signal of the Y-polarization state based on the delay values of the N transmitters and the spreading codes of the N transmitters by using the despreading module, to obtain the N first baseband signals and the N second baseband signals. The N delay values are respectively determined based on the differences between the synchronization positions of the first polarization states and the synchronization positions of the second polarization states of the N transmitters. Further, equalization filtering processing is performed on the N first baseband signals and the N second baseband signals, to obtain the recovered data of the first polarization states and the recovered data of the second polarization states of the N transmitters, that is, received to-be-processed digital signals are synchronized and despread based on the first polarization state and the second polarization state of each transmitter. Further, recovered data of first polarization states and recovered data of second polarization states of different transmitters are obtained, thereby implementing receiving of data of dual polarization states of a plurality of transmitters, that is, implementing coherent CDMA multipoint-to-point data transmission in an optical communications system. In addition, in a process of obtaining data of the first polarization states and the second polarization states of the different transmitters, a DGD effect on the fiber channel can be effectively compensated for, thereby effectively improving data transmission quality.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
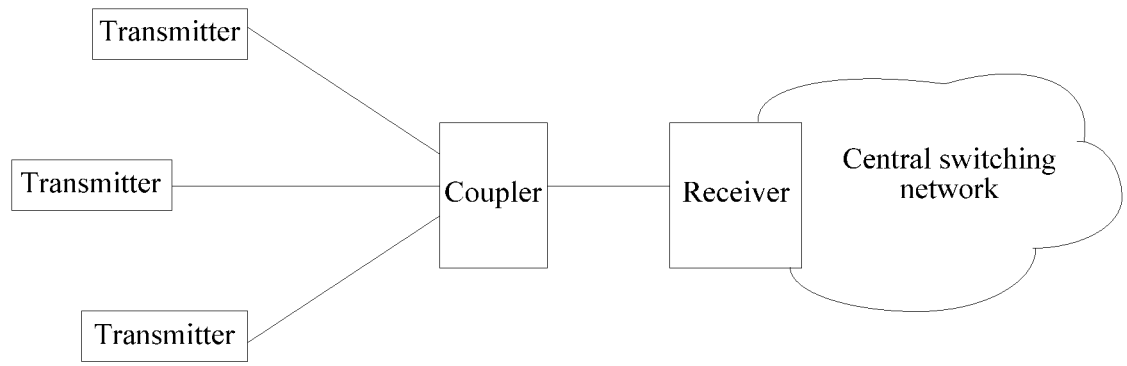
FIG. 1 is a schematic diagram of an application scenario of the present invention.

FIG. 1 is a schematic diagram of an application scenario of the present invention. As shown in FIG. 1, the application scenario in this embodiment of the present invention may be a CDMA system accessed by a plurality of users. The plurality of users access the system in FIG. 1 by using a transmitter in this embodiment of the present invention. As an access node, the transmitter may receive uplink transmission data of a user, and send, after performing corresponding processing on the uplink transmission data, the uplink transmission data of the user to a central exchange node by using a fiber. A receiver in this embodiment of the present invention may be used as an ingress node for connecting the uplink transmission data of the plurality of users to a central switching network. As shown in FIG. 1, a coupler may be disposed between the central switching network and various access nodes. The coupler is configured to couple optical signals of different users. The transmitter in this embodiment of the present invention may perform spreading processing on uplink transmission data of a user, then, perform other corresponding processing, and send the uplink transmission data of the user to the central switching network. The receiver, located in the central switching network, in this embodiment of the present invention receives transmission data. The transmission data received by the receiver comes from different transmitters. Moreover, optical signals of various transmitters have a same wavelength. The optical signal of each transmitter is a dual-polarization signal. The receiver in this embodiment of the present invention can implement receiving of data of a plurality of transmitters. The following describes the receiver in this embodiment of the present invention in detail by using several specific embodiments.

Figure 2:
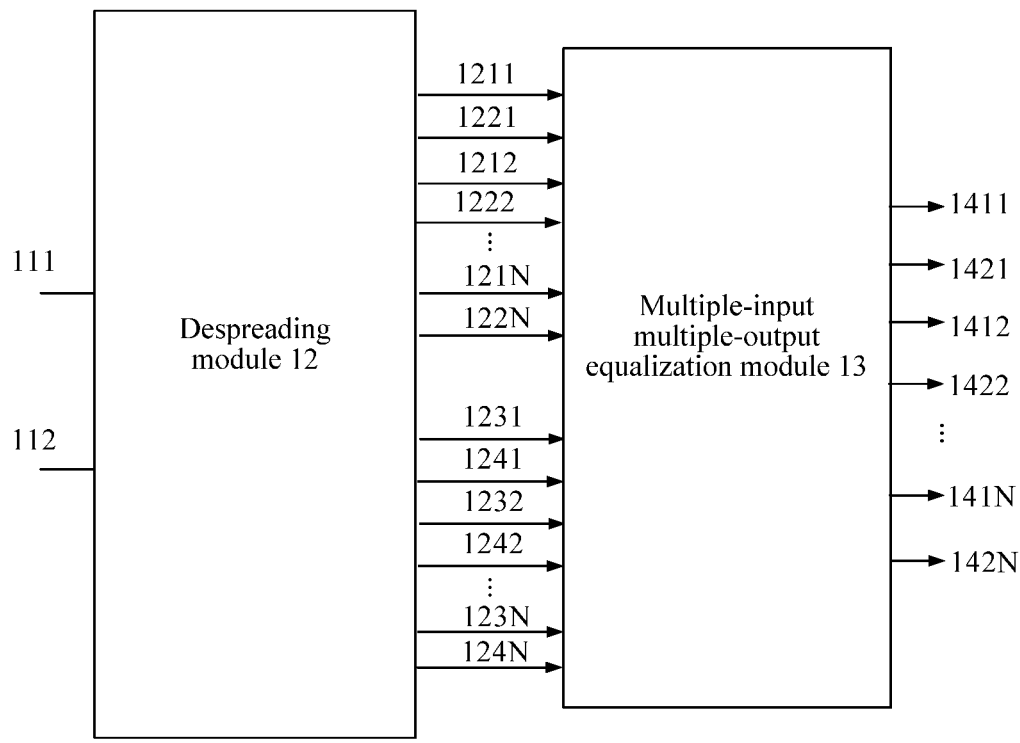
FIG. 2 is a schematic structural diagram of one embodiment of a receiver according to the present invention.

FIG. 2 is a schematic structural diagram of Embodiment 1 of a receiver according to the present invention. As shown in FIG. 2, the receiver in this embodiment may include: two first input ends (111 and 112), a despreading module 12, a multiple-input multiple-output equalization module 13, and 2N first output ends (1411, 1421, 1412, 1422, ..., 141N, and 142N). The first input ends (111 and 112) are connected to the despreading module 12. The despreading module 12 includes 4N second output ends (1211, 1221, 1212, 1222, ..., 121N, 122N, 1231, 1241, 1232, 1342, ..., 123N, and 124N). The 4N second output ends (1211, 1221, 1212, 1222, ..., 121N, 122N, 1231, 1241, 1232, 1342, ..., 123N, and 124N) are separately connected to the multiple-input multiple-output equalization module 13.

The first input ends (111 and 112) are configured to receive to-be-processed digital signals. The to-be-processed digital signals include a digital signal of an X-polarization state and a digital signal of a Y-polarization state. The first input end 111 may be configured to receive the digital signal of the X-polarization state, and the second input end 112 may be configured to receive the digital signal of the Y-polarization state. The digital signal of the X-polarization state includes components of digital signals of the X-polarization state of all transmitters. The digital signal of the Y-polarization state includes components of digital signals of the Y-polarization state of all the transmitters. The despreading module 12 is configured to despread the digital signal of the X-polarization state and the digital signal of the Y-polarization state based on N delay values and spreading codes of N transmitters, to obtain N first baseband signals and N second baseband signals, where each first baseband signal includes a first baseband signal of the X-polarization state and a first baseband signal of the Y-polarization state, each second baseband signal includes a second baseband signal of the X-polarization state and a second baseband signal of the Y-polarization state, and the N delay values are respectively determined based on differences between synchronization positions of first polarization states and synchronization positions of second polarization states of the N transmitters. The multiple-input multiple-output equalization module 13 is configured to perform equalization filtering processing on the N first baseband signals and the N second baseband signals, to obtain recovered data of the first polarization states and recovered data of the second polarization states of the N transmitters. The 2N first output ends each are configured to output recovered data of one polarization state of one transmitter, where N is a positive integer greater than or equal to 1, and specifically, N is equal to a quantity of transmitters.

It should be noted that a signal of each transmitter has a first polarization state (u) and a second polarization state (v). First polarization states and second polarization states of different transmitters may vary. The first polarization state (u) and the second polarization state (v) are orthogonal. To be specific, for example, a first polarization state (u1) and a second polarization state (v1) of a transmitter 1 are orthogonal, and a first polarization state (u2) and a second polarization state (v2) of a transmitter 2 are orthogonal.

Specifically, in an example of the present invention, the first input ends (111 and 112) of the receiver receive the to-be-processed digital signals, and the to-be-processed digital signals include the digital signal of the X-polarization state and the digital signal of the Y-polarization state. It may be understood that the receiver further includes a polarization splitter (PBS), two 90-degree optical hybrids, four balance detectors, four analog to digital (A/D) converters, and a dispersion compensation module. The receiver receives an optical signal transmitted by a fiber communications system. The optical signal is first split into two optical signals through the PBS. One optical signal is in the X-polarization state, and the other optical signal is in the Y-polarization state. The optical signals in the two polarization states each pass through one 90-degree optical hybrid. Each 90-degree optical hybrid mixes, in complex-domain space, an input signal thereof with four quadrilateral forms of an LO oscillator signal. Then, each 90-degree optical hybrid transmits four mixed signals to two balance detectors. Outputs of the balance detectors are converted into digital signals by the A/D converters. After an I signal and a Q signal of each polarization state pass through one A/D converter, two digital signals of the polarization state are output. After the foregoing processing is performed on the optical signal received by the receiver in this embodiment, I(XI) and Q(XQ) outputs in the X-polarization state are output, and I(YI) and Q(YQ) outputs in the Y-polarization state are output. To be specific, four outputs of the A/D converters of the receiver are XI, XQ, YI, and YQ. Then, dispersion compensation is performed on four signals, to output the digital signal of the X-polarization state (which may be represented by X herein) and the digital signal of the Y-polarization state (which may be represented by Y herein) that are received by the first input ends (111 and 112) in this embodiment.

In this embodiment, after the first input ends (111 and 112) of the receiver respectively receive the to-be-processed digital signals (the digital signal of the X-polarization state (X) and the digital signal of the Y-polarization state (Y)), the despreading module 12 may determine the synchronization positions of the first polarization states and the synchronization positions of the second polarization states of the N transmitters, determine a delay value of each transmitter based on a difference between the synchronization position of the first polarization state and the synchronization position of the second polarization state of the transmitter, and despread the to-be-processed digital signals based on the delay values of the N transmitters and the spreading codes of the N transmitters, to obtain the N first baseband signals and the N second baseband signals. Specifically, the despreading module 12 makes two copies of a to-be-processed digital signal. In an implementable manner, for one copy, the to-be-processed digital signal is despread based on the synchronization positions of the first polarization states of the N transmitters and the spreading codes of the N transmitters, to obtain the N first baseband signals; and for the other copy, the to-be-processed digital signal is despread based on the synchronization positions of the second polarization states of the N transmitters, the delay values of the N transmitters, and the spreading codes of the N transmitters, to obtain the N second baseband signals. In another implementable manner, for one copy, the to-be-processed digital signal is despread based on the synchronization positions of the first polarization states of the N transmitters, the delay values of the N transmitters, and the spreading codes of the N transmitters, to obtain the N first baseband signals; and for the other copy, the to-be-processed digital signal is despread based on the synchronization positions of the second polarization states of the N transmitters and the spreading codes of the N transmitters, to obtain the N second baseband signals.

After the N first baseband signals and the N second baseband signals are obtained, the receiver in this embodiment performs equalization filtering processing on the N first baseband signals and the N second baseband signals by using the multiple-input multiple-output equalization module 13, to obtain the recovered data of the first polarization states and the recovered data of the second polarization states of the N transmitters, that is, original data of the first polarization state and original data of the second polarization state that are sent by the N transmitters.

It may be understood that before the first output ends output the recovered data of the first polarization states and the recovered data of the second polarization states of the transmitters, the first output ends may further perform carrier frequency offset compensation and carrier phase recovery processing.

In this embodiment, the receiver receives the digital signal of the X-polarization state and the digital signal of the Y-polarization state; and despreads the digital signal of the X-polarization state and the digital signal of the Y-polarization state based on the delay values of the N transmitters and the spreading codes of the N transmitters by using the despreading module, to obtain the N first baseband signals and the N second baseband signals. The N delay values are respectively determined based on the differences between the synchronization positions of the first polarization states and the synchronization positions of the second polarization states of the N transmitters. Further, equalization filtering processing is performed on the N first baseband signals and the N second baseband signals, to obtain the recovered data of the first polarization states and the recovered data of the second polarization states of the N transmitters, that is, received to-be-processed digital signals are synchronized and despread based on the first polarization state and the second polarization state of each transmitter. Further, recovered data of first polarization states and recovered data of second polarization states of different transmitters are obtained, thereby implementing receiving of data of dual polarization states of a plurality of transmitters, that is, implementing coherent CDMA multipoint-to-point data transmission in an optical communications system. In addition, in a process of obtaining data of the first polarization states and the second polarization states of the different transmitters, a DGD effect on the fiber channel can be effectively compensated for, thereby effectively improving data transmission quality.

The DGD effect specifically means that PMD is caused due to slight birefringence in a fiber, so that different polarization state components of a signal of one transmitter generate a discrete effect.

The technical solution of the embodiment of the receiver shown in FIG. 2 is described below in detail by using several specific embodiments.

FIG. 3 to FIG. 6 are used to describe four different disposing positions of an adjustable delay module.

Figure 3:
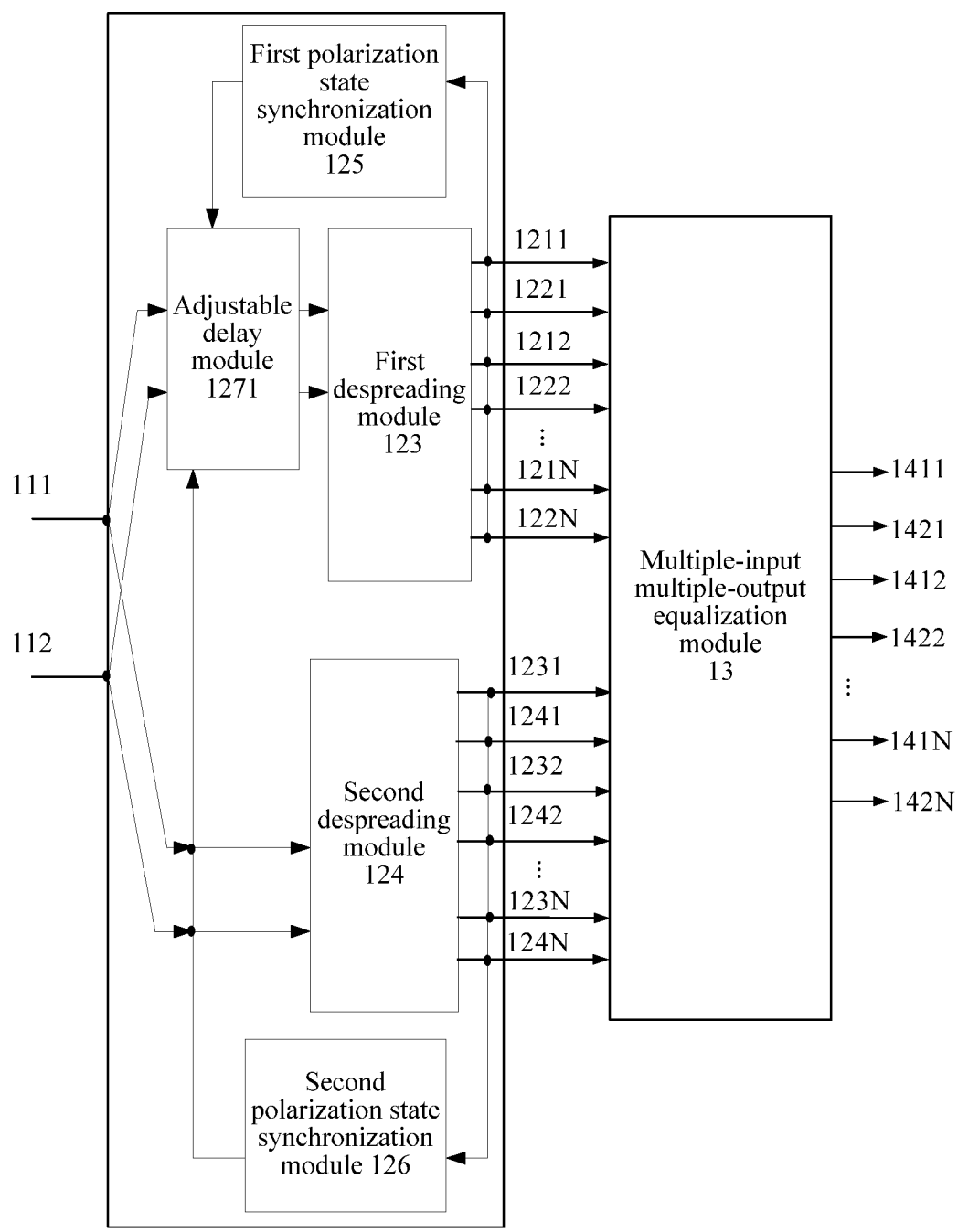
FIG. 3 is a schematic structural diagram of one embodiment of a receiver according to the present invention.

FIG. 3 is a schematic structural diagram of one embodiment of a receiver according to the present invention. As shown in FIG. 3, in the receiver in this embodiment based on the embodiment shown in FIG. 2, the despreading module 12 may specifically include: a first despreading module 123 and a second despreading module 124. The first despreading module 123 and the second despreading module 124 each include two input ends and 2N output ends. The two input ends of the first despreading module 123 and the two input ends of the second despreading module 124 are separately connected to the first input ends (111 and 112). The 2N output ends of the first despreading module 123 and the 2N output ends of the second despreading module 124 are separately connected to one second output end (1211, 1221, 1212, 1222, . . . , 121N, 122N, 1231, 1241, 1232, 1342, . . . , 123N, or 124N). The first despreading module 123 is configured to output the N first baseband signals, and an output end of the first despreading module 123 is configured to output a first baseband signal of an X-polarization state of a transmitter or a first baseband signal of a Y-polarization state of a transmitter. For example, the first despreading module 123 outputs a first baseband signal of an X-polarization state of a transmitter 1 by using the second output end 1211, the first despreading module 123 outputs a first baseband signal of a Y-polarization state of the transmitter 1 by using the second output end 1221, the first despreading module 123 outputs a first baseband signal of an X-polarization state of a transmitter 2 by using the second output end 1212, and the first despreading module 123 outputs a first baseband signal of a Y-polarization state of the transmitter 2 by using the second output end 1222. The second despreading module 124 is configured to output the N second baseband signals, and an output end of the second despreading module 124 is configured to output a second baseband signal of an X-polarization state of a transmitter or a second baseband signal of a Y-polarization state of a transmitter. For example, the second despreading module 124 outputs a second baseband signal of the X-polarization state of the transmitter 1 by using the second output end 1231, the second despreading module 124 outputs a second baseband signal of the Y-polarization state of the transmitter 1 by using the second output end 1241, the first despreading module 124 outputs a second baseband signal of the X-polarization state of the transmitter 2 by using the second output end 1232, and the second despreading module 124 outputs a second baseband signal of the Y-polarization state of the transmitter 2 by using the second output end 1342.

The despreading module 12 may further include a first polarization state synchronization module 125 and a second polarization state synchronization module 126. The first polarization state synchronization module 125 is configured to determine the synchronization positions of the first polarization states of the N transmitters based on training sequences of the first polarization states of the N transmitters, the digital signal of the X-polarization state, and the digital signal of the Y-polarization state. The second polarization state synchronization module 126 is configured to determine the synchronization positions of the second polarization states of the N transmitters based on training sequences of the second polarization states of the N transmitters, the digital signal of the X-polarization state, and the digital signal of the Y-polarization state.

Further, the despreading module 12 may further include an adjustable delay module 1271. The adjustable delay module 1271 is disposed between the first input ends (111 and 112) and the first despreading module 123. The adjustable delay module 1271 is further connected to the first polarization state synchronization module 125 and the second polarization state synchronization module 126. The adjustable delay module 1271 is configured to: determine the delay values of the N transmitters based on the differences between the synchronization positions of the first polarization states of the N transmitters and the synchronization positions of the second polarization states of the N transmitters; perform delay processing on the to-be-processed digital signals (the digital signal of the X-polarization state and the digital signal of the Y-polarization state) separately based on the delay values of the N transmitters, to obtain N delayed digital signals of the X-polarization state and N delayed digital signals of the Y-polarization state; and output the N delayed digital signals of the X-polarization state and the N delayed digital signals of the Y-polarization state to the first despreading module 123. The first despreading module despreads the N delayed digital signals of the X-polarization state and the N delayed digital signals of the Y-polarization state by using the spreading codes of the N transmitters, to obtain the N first baseband signals.

In other words, in this embodiment, the receiver specifically delays the to-be-processed digital signals based on the delay values of the N transmitters, and inputs the N delayed to-be-processed digital signals to the first despreading module. The first despreading module despreads the to-be-processed digital signals by using the spreading codes of the N transmitters respectively, to obtain the N first baseband signals. It should be noted that in this embodiment, a delay does not need to be performed in the second despreading module, the synchronization positions of the second polarization states of the N transmitters are determined based only on the to-be-processed digital signals and training sequences of the second polarization states of the N transmitters. The to-be-processed digital signals are despread based on the synchronization positions of the N second polarization states and the spreading codes of the N transmitters, to obtain the N second baseband signals.

In this embodiment, in the receiver, the adjustable delay module is disposed between the first input ends and the first despreading module. The N delay values of the adjustable delay module are respectively determined based on the differences between the synchronization positions of the first polarization states and the synchronization positions of the second polarization states of the N transmitters, to synchronize and despread received to-be-processed digital signals of two polarization states, and effectively DGD effects generated by different polarization state components when a data signal is transmitted in a fiber.

Figure 4:
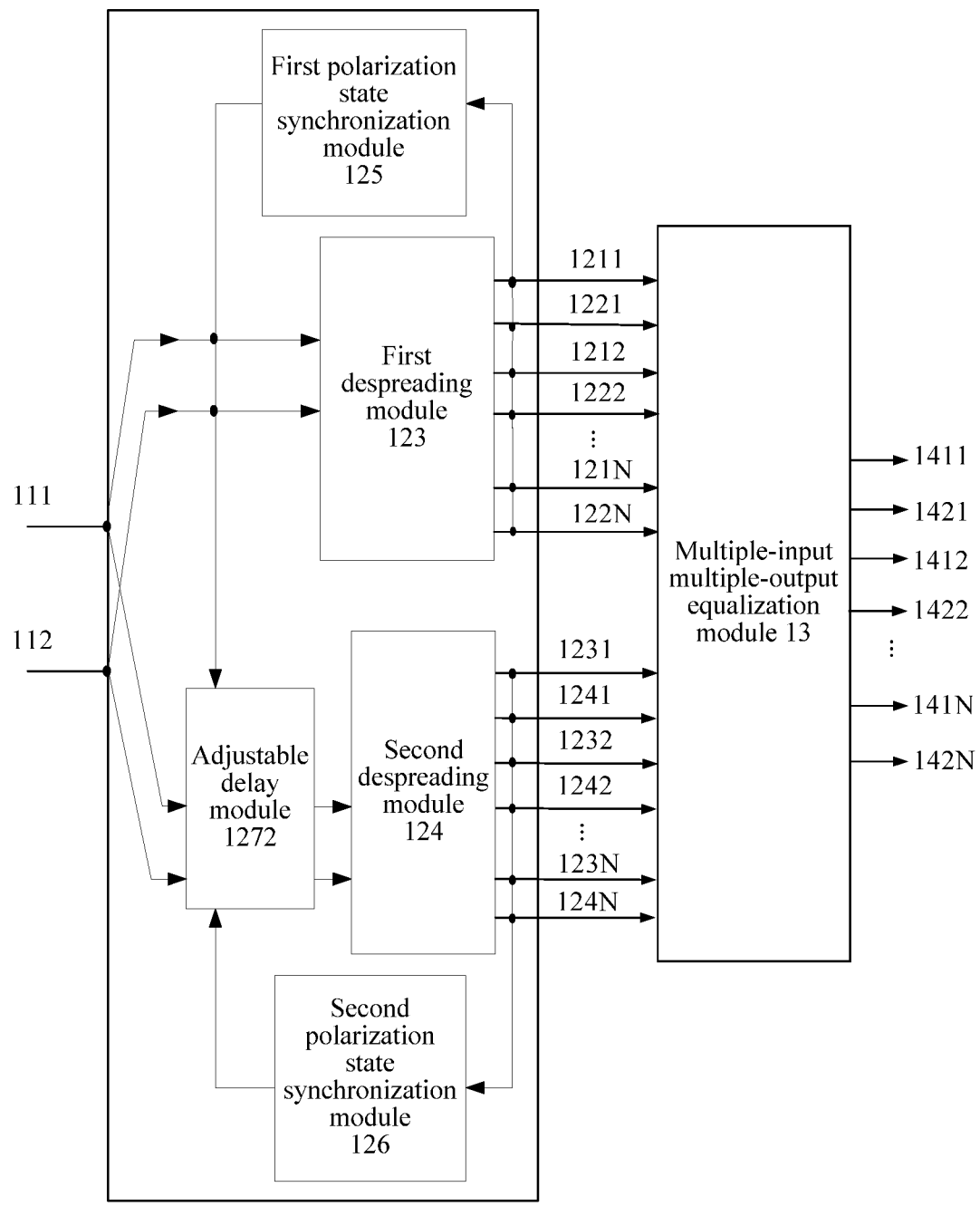
FIG. 4 is a schematic structural diagram of one embodiment of a receiver according to the present invention.

FIG. 4 is a schematic structural diagram of one embodiment of a receiver according to the present invention. As shown in FIG. 4, in the receiver in this embodiment based on the embodiment shown in FIG. 2, the despreading module 12 may specifically include: a first despreading module 123 and a second despreading module 124. The first despreading module 123 and the second despreading module 124 each include two input ends and 2N output ends. The two input ends of the first despreading module 123 and the two input ends of the second despreading module 124 are separately connected to the first input ends (111 and 112). The 2N output ends of the first despreading module 123 and the 2N output ends of the second despreading module 124 are separately connected to one second output end (1211, 1221, 1212, 1222, . . . , 121N, 122N, 1231, 1241, 1232, 1342, . . . , 123N, or 124N). The first despreading module 123 is configured to output the N first baseband signals, and one output end of the first despreading module 123 is configured to output a first baseband signal of an X-polarization state of one transmitter or a first baseband signal of a Y-polarization state of one transmitter. For example, the first despreading module 123 outputs a first baseband signal of an X-polarization state of a transmitter 1 by using the second output end 1211, the first despreading module 123 outputs a first baseband signal of a Y-polarization state of the transmitter 1 by using the second output end 1221, the first despreading module 123 outputs a first baseband signal of an X-polarization state of a transmitter 2 by using the second output end 1212, and the first despreading module 123 outputs a first baseband signal of a Y-polarization state of the transmitter 2 by using the second output end 1222. The second despreading module 124 is configured to output the N second baseband signals, and one output end of the second despreading module 124 is configured to output a second baseband signal of an X-polarization state of one transmitter or a second baseband signal of a Y-polarization state of one transmitter. For example, the second despreading module 124 outputs a second baseband signal of the X-polarization state of the transmitter 1 by using the second output end 1231, the second despreading module 124 outputs a second baseband signal of the Y-polarization state of the transmitter 1 by using the second output end 1241, the first despreading module 124 outputs a second baseband signal of the X-polarization state of the transmitter 2 by using the second output end 1232, and the second despreading module 124 outputs a second baseband signal of the Y-polarization state of the transmitter 2 by using the second output end 1342.

The despreading module 12 may further include a first polarization state synchronization module 125 and a second polarization state synchronization module 126. The first polarization state synchronization module 125 is configured to determine the synchronization positions of the first polarization states of the N transmitters based on training sequences of the first polarization states of the N transmitters, the digital signal of the X-polarization state, and the digital signal of the Y-polarization state. The second polarization state synchronization module 126 is configured to determine the synchronization positions of the second polarization states of the N transmitters based on training sequences of the second polarization states of the N transmitters, the digital signal of the X-polarization state, and the digital signal of the Y-polarization state.

Further, different from the embodiment shown in FIG. 3, in this embodiment, the adjustable delay module of the receiver is disposed between the first input ends (111 and 112) and the second despreading module 124. The adjustable delay module 1272 is further connected to the first polarization state synchronization module 125 and the second polarization state synchronization module 126. The adjustable delay module 1272 is configured to: determine delay values of the N transmitters based on the differences between the synchronization positions of the first polarization states of the N transmitters and the synchronization positions of the second polarization states of the N transmitters, separately perform delay processing on the to-be-processed digital signals (the digital signal of the X-polarization state and the digital signal of the Y-polarization state) based on the delay values of the N transmitters to obtain N delayed to-be-processed digital signals (N delayed digital signals of the X-polarization state and N delayed digital signals of the Y-polarization state), and output the N delayed to-be-processed digital signals to the second despreading module 124. The second despreading module 124 separately despreads the N delayed to-be-processed digital signals by using the spreading codes of the N transmitters, to obtain the N second baseband signals.

In other words, in this embodiment, the receiver specifically delays the to-be-processed digital signals based on the delay values of the N transmitters, and inputs the N delayed to-be-processed digital signals to the second despreading module. The second despreading module separately despreads the to-be-processed digital signals by using the spreading codes of the N transmitters, to obtain the N second baseband signals. It should be noted that in this embodiment, delay does not need to be performed in the first despreading module, the synchronization positions of the first polarization states of the N transmitters are determined based only on the to-be-processed digital signals and training sequences of the first polarization states of the N transmitters. The to-be-processed digital signals are despread based on the N synchronization positions of the first polarization states and the spreading codes of the N transmitters, to obtain the N first baseband signals.

In this embodiment, in the receiver, the adjustable delay module is disposed between the first input ends and the second despreading module. The N delay values of the adjustable delay module are determined based on the synchronization positions of the first polarization states and the synchronization positions of the second polarization states of the N transmitters, to synchronize and despread received to-be-processed digital signals of two polarization states, and effectively reduce DGD effects generated by different polarization state components when a data signal is transmitted in a fiber.

Figure 5A:
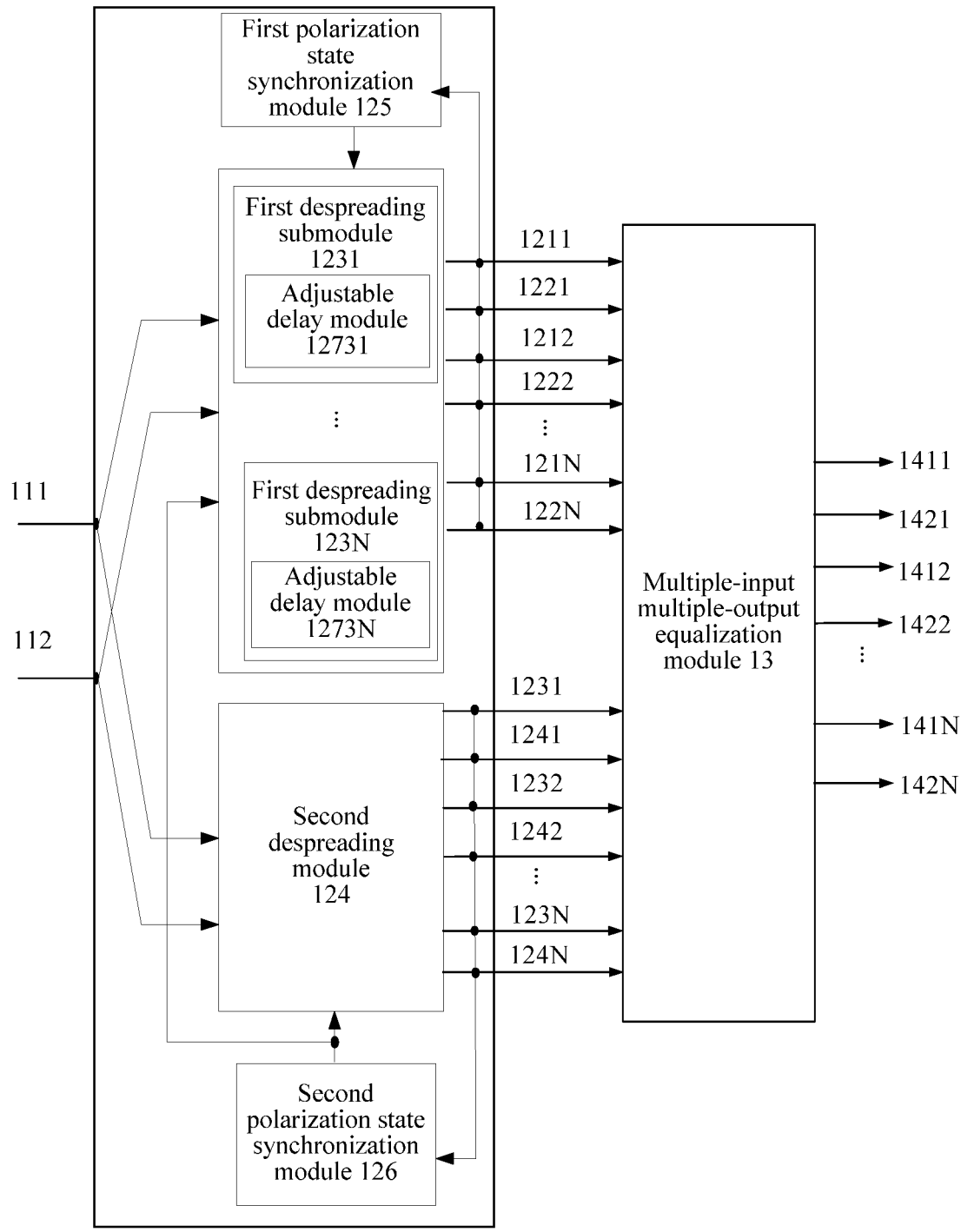
FIG. 5A is a schematic structural diagram of one embodiment of a receiver according to the present invention.
Figure 5B:
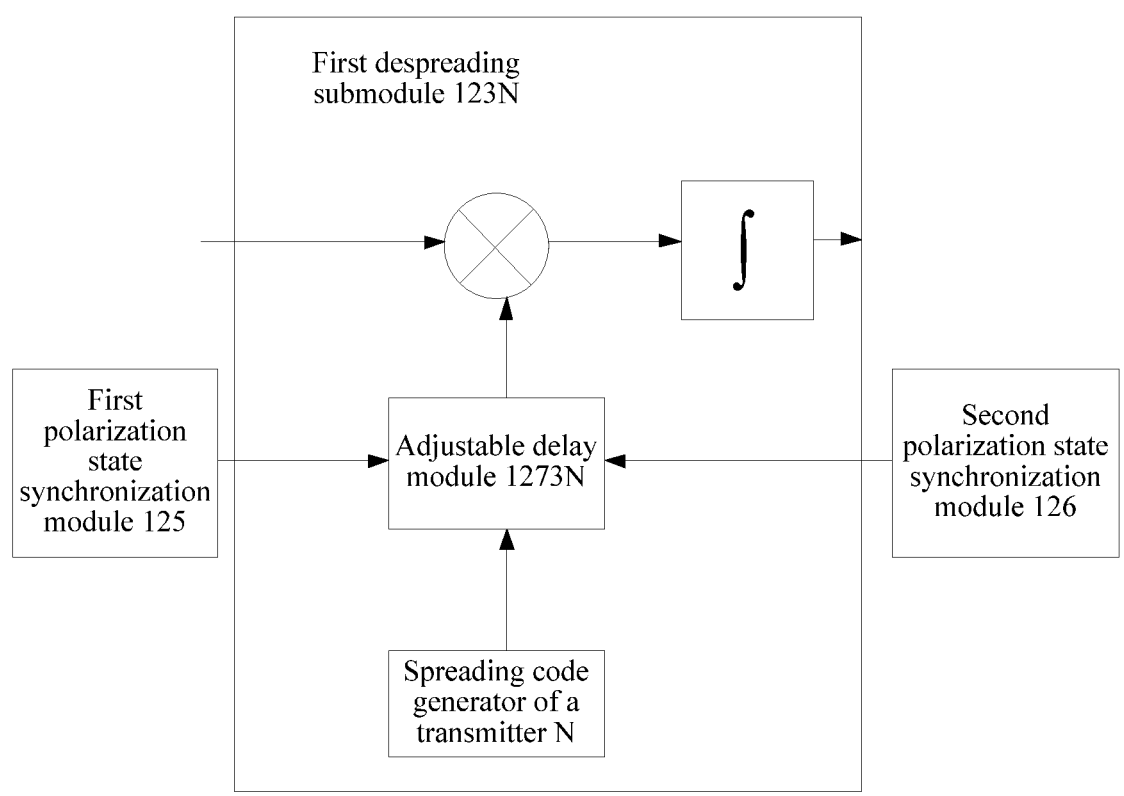
FIG. 5B is a schematic structural diagram of a first despreading submodule according to the present invention.

FIG. 5A is a schematic structural diagram of one embodiment of a receiver according to the present invention. FIG. 5B is a schematic structural diagram of a first despreading submodule according to the present invention. As shown in FIG. 5A, in the receiver in this embodiment based on the embodiment shown in FIG. 2, the despreading module 12 may specifically include: a first despreading module 123 and a second despreading module 124. The first despreading module 123 and the second despreading module 124 each include two input ends and 2N output ends. The two input ends of the first despreading module 123 and the two input ends of the second despreading module 124 are separately connected to the first input ends (111 and 112). The 2N output ends of the first despreading module 123 and the 2N output ends of the second despreading module 124 are separately connected to one second output end (1211, 1221, 1212, 1222, . . . , 121N, 122N, 1231, 1241, 1232, 1342, . . . , 123N, or 124N). The first despreading module 123 is configured to output the N first baseband signals, and one output end of the first despreading module 123 is configured to output a first baseband signal of an X-polarization state of one transmitter or a first baseband signal of a Y-polarization state of one transmitter. For example, the first despreading module 123 outputs a first baseband signal of an X-polarization state of a transmitter 1 by using the second output end 1211, the first despreading module 123 outputs a first baseband signal of a Y-polarization state of the transmitter 1 by using the second output end 1221, the first despreading module 123 outputs a first baseband signal of an X-polarization state of a transmitter 2 by using the second output end 1212, and the first despreading module 123 outputs a first baseband signal of a Y-polarization state of the transmitter 2 by using the second output end 1222. The second despreading module 124 is configured to output the N second baseband signals, and one output end of the second despreading module 124 is configured to output a second baseband signal of an X-polarization state of one transmitter or a second baseband signal of a Y-polarization state of one transmitter. For example, the second despreading module 124 outputs a second baseband signal of the X-polarization state of the transmitter 1 by using the second output end 1231, the second despreading module 124 outputs a second baseband signal of the Y-polarization state of the transmitter 1 by using the second output end 1241, the first despreading module 124 outputs a second baseband signal of the X-polarization state of the transmitter 2 by using the second output end 1232, and the second despreading module 124 outputs a second baseband signal of the Y-polarization state of the transmitter 2 by using the second output end 1342.

The despreading module 12 may further include a first polarization state synchronization module 125 and a second polarization state synchronization module 126. The first polarization state synchronization module 125 is configured to determine the synchronization positions of the first polarization states of the N transmitters based on training sequences of the first polarization states of the N transmitters, the digital signal of the X-polarization state, and the digital signal of the Y-polarization state. The second polarization state synchronization module 126 is configured to determine the synchronization positions of the second polarization states of the N transmitters based on training sequences of the second polarization states of the N transmitters, the digital signal of the X-polarization state, and the digital signal of the Y-polarization state.

Further, different from the embodiments shown in FIG. 3 and FIG. 4, in this embodiment, the despreading module 12 may further include N adjustable delay modules (12731, 12732, . . . , and 1273N). The first despreading module 123 includes N first despreading submodules (1231, 1232, . . . , and 123N). The N adjustable delay modules (12731, 12732, . . . , and 1273N) each are disposed in one first despreading submodule, and one first despreading submodule is configured to output a first baseband signal of the X-polarization state and a first baseband signal of the Y-polarization state of one transmitter. For example, the first despreading submodule 1231 is configured to output a first baseband signal of the X-polarization state and a first baseband signal of an Y-polarization state of a transmitter 1, and the first despreading submodule 1232 is configured to output a first baseband signal of the X-polarization state and a first baseband signal of a Y-polarization state of a transmitter 2. Each adjustable delay module determines a delay value of one transmitter based on a difference between a synchronization position of a first polarization state of the transmitter and a synchronization position of a second polarization state of the transmitter, performs delay processing on a spreading code of the transmitter based on the delay value of the transmitter to obtain a delayed spreading code of the transmitter, and outputs the delayed spreading code of the transmitter to a first despreading submodule corresponding to the spreading code. For example, the adjustable delay module 12731 determines a delay value of the transmitter 1 based on a difference between a synchronization position of a first polarization state of the transmitter 1 and a synchronization position of a second polarization state of the transmitter 1, performs delay processing on a spreading code of the transmitter 1 based on the delay value of the transmitter 1 to obtain a delayed spreading code of the transmitter 1, and outputs the delayed spreading code of the transmitter 1 to the first despreading submodule 1231. The adjustable delay module 1273N determines a delay value of a transmitter N based on a difference between a synchronization position of a first polarization state of the transmitter N and a synchronization position of a second polarization state of the transmitter N, performs delay processing on a spreading code of the transmitter N based on the delay value of the transmitter N to obtain a delayed spreading code of the transmitter N, and outputs the delayed spreading code of the transmitter N to the first despreading submodule 123N. Other adjustable delay modules are similar to the first despreading submodule 1231 and the first despreading submodule 123N, and are not described one by one herein. Each first despreading submodule is configured to despread the to-be-processed digital signals (the digital signal of the X-polarization state and the digital signal of the Y-polarization state) by using a delayed spreading code of one transmitter, to obtain a first baseband signal. In other words, spreading codes of different transmitters are set for different first despreading submodules. One adjustable delay module performs delay processing on a spreading code of one transmitter, and further, separately despreads the to-be-processed digital signals (the digital signal of the X-polarization state and the digital signal of the Y-polarization state). Using an $N^{th}$ first despreading submodule as an example for a specific description, a same connection structure may be used for other first despreading submodules. Specifically, as shown in FIG. 5B, the adjustable delay module 1273N is disposed in the $N^{th}$ first despreading submodules. The adjustable delay module 1273N is connected to the first polarization state synchronization module 125, the second polarization state synchronization module 126, and a spreading code generator of the transmitter N. The adjustable delay module 1273N performs delay processing on the spreading code of the transmitter N, to obtain the delayed spreading code of the transmitter N. The $N^{th}$ first despreading submodule despreads the received to-be-processed digital signals (the digital signal of the X-polarization state and the digital signal of the Y-polarization state) by using the delayed spreading code of the transmitter N. The despreading processing may be shown in FIG. 5B. First, multiplication is performed; then, integrating is performed; and further, a first baseband signal of the transmitter N is output. Specifically, a first baseband signal of the X-polarization state of the transmitter N may be output by using the second output end 121N, and a first baseband signal of the Y-polarization state of the transmitter N is output by using the second output end 122N.

In other words, in this embodiment, the adjustable delay module may be specifically disposed in each first despreading submodule (1231, 1232, . . . , or 123N). Each adjustable delay module is configured to: delay a spreading code by using a delay value; and further, delay the to-be-processed digital signals, to obtain the N first baseband signals. It should be noted that in this embodiment, delay does not need to be performed in the second despreading module, the synchronization positions of the second polarization states of the N transmitters are determined based only on the to-be-processed digital signals and training sequences of the second polarization states of the N transmitters. The to-be-processed digital signals are despread based on the N synchronization positions of the second polarization states and the spreading codes of the N transmitters, to obtain the N second baseband signals.

In this embodiment, in the receiver, an adjustable delay module is disposed in each first despreading submodule in the first despreading module. A delay value of each adjustable delay module is determined based on a difference between a synchronization position of a first polarization state and a synchronization position of a second polarization state of a transmitter corresponding to the adjustable delay module, to synchronize and despread received to-be-processed digital signals of two polarization states, and effectively reduce DGD effects generated by different polarization state components when a data signal is transmitted in a fiber.

Figure 6:
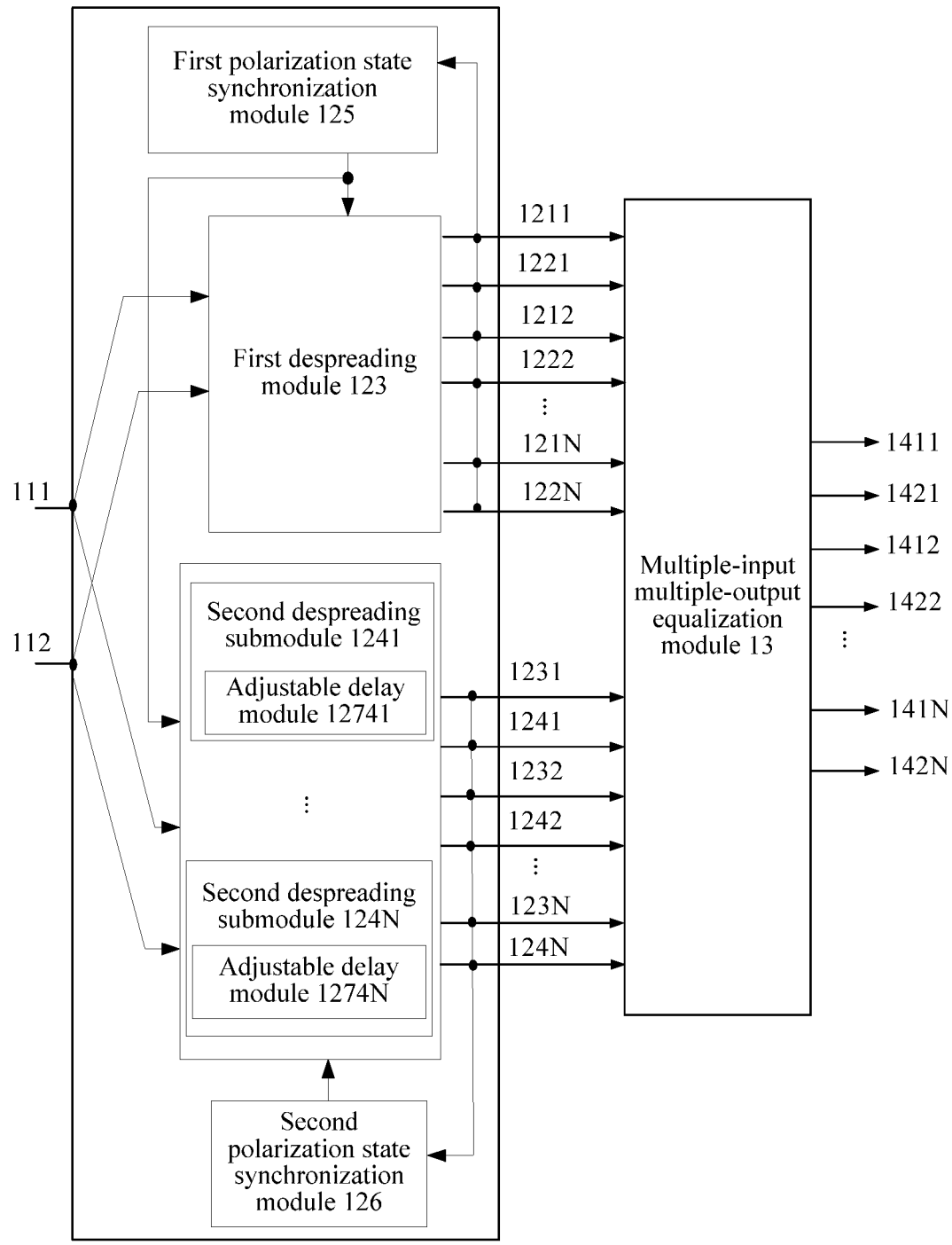
FIG. 6 is a schematic structural diagram of one embodiment of a receiver according to the present invention.

FIG. 6 is a schematic structural diagram of one embodiment of a receiver according to the present invention. As shown in FIG. 6, in the receiver in this embodiment based on the embodiment shown in FIG. 2, the despreading module 12 may specifically include: a first despreading module 123 and a second despreading module 124. The first despreading module 123 and the second despreading module 124 each include two input ends and 2N output ends. The two input ends of the first despreading module 123 and the two input ends of the second despreading module 124 are separately connected to the first input ends (111 and 112). The 2N output ends of the first despreading module 123 and the 2N output ends of the second despreading module 124 are separately connected to one second output end (1211, 1221, 1212, 1222, . . . , 121N, 122N, 1231, 1241, 1232, 1342, . . . , 123N, or 124N). The first despreading module 123 is configured to output the N first baseband signals, and one output end of the first despreading module 123 is configured to output a first baseband signal of an X-polarization state of one transmitter or a first baseband signal of a Y-polarization state of one transmitter. For example, the first despreading module 123 outputs a first baseband signal of an X-polarization state of a transmitter 1 by using the second output end 1211, the first despreading module 123 outputs a first baseband signal of a Y-polarization state of the transmitter 1 by using the second output end 1221, the first despreading module 123 outputs a first baseband signal of an X-polarization state of a transmitter 2 by using the second output end 1212, and the first despreading module 123 outputs a first baseband signal of a Y-polarization state of the transmitter 2 by using the second output end 1222. The second despreading module 124 is configured to output the N second baseband signals, and one output end of the second despreading module 124 is configured to output a second baseband signal of an X-polarization state of one transmitter or a second baseband signal of a Y-polarization state of one transmitter. For example, the second despreading module 124 outputs a second baseband signal of the X-polarization state of the transmitter 1 by using the second output end 1231, the second despreading module 124 outputs a second baseband signal of the Y-polarization state of the transmitter 1 by using the second output end 1241, the first despreading module 124 outputs a second baseband signal of the X-polarization state of the transmitter 2 by using the second output end 1232, and the second despreading module 124 outputs a second baseband signal of the Y-polarization state of the transmitter 2 by using the second output end 1342.

The despreading module 12 may further include a first polarization state synchronization module 125 and a second polarization state synchronization module 126. The first polarization state synchronization module 125 is configured to determine the synchronization positions of the first polarization states of the N transmitters based on training sequences of the first polarization states of the N transmitters, the digital signal of the X-polarization state, and the digital signal of the Y-polarization state. The second polarization state synchronization module 126 is configured to determine the synchronization positions of the second polarization states of the N transmitters based on training sequences of the second polarization states of the N transmitters, the digital signal of the X-polarization state, and the digital signal of the Y-polarization state.

Further, different from the embodiments shown in FIG. 3 and FIG. 4, the despreading module 12 may further include N adjustable delay modules (12741, 12742, . . . , and 1274N), the second despreading module may include N second despreading submodules (1241, 1242, . . . , and 124N), the N adjustable delay modules each are disposed in one second despreading submodule, and one second despreading submodule is configured to output a first baseband signal of the X-polarization state and a second baseband signal of the Y-polarization state of one transmitter. Each adjustable delay module determines a delay value of one transmitter based on a difference between a synchronization position of a first polarization state of the transmitter and a synchronization position of a second polarization state of the transmitter, performs delay processing on the delay value of the transmitter and a spreading code of the transmitter to obtain a delayed spreading code of the transmitter, and outputs the delayed spreading code of the transmitter to a second despreading submodule corresponding to the spreading code. Each second despreading submodule is configured to despread the to-be-processed digital signals (the digital signal of the X-polarization state and the digital signal of the Y-polarization state) by using a delayed spreading code of one transmitter, to obtain one second baseband signal. In other words, in this embodiment, the adjustable delay module may be specifically disposed in each second despreading submodule (1241, 1242, . . . , or 124N). Each adjustable delay module is configured to: delay a spreading code by using one delay value; and further, delay the to-be-processed digital signals, to obtain the N second baseband signals. It should be noted that in this embodiment, delay does not need to be performed in the first despreading module, the synchronization positions of the first polarization states of the N transmitters are determined based only on the to-be-processed digital signals and training sequences of the first polarization states of the N transmitters. The to-be-processed digital signals are despread based on the N synchronization positions of the first polarization states and the spreading codes of the N transmitters, to obtain the N first baseband signals.

In this embodiment, in the receiver, an adjustable delay module is disposed in each second despreading submodule in the second despreading module. A delay value of each adjustable delay module is determined based on a difference between a synchronization position of a first polarization state and a synchronization position of a second polarization state of a transmitter corresponding to the adjustable delay module, to synchronize and despread received to-be-processed digital signals of two polarization states, and effectively reduce DGD effects generated by different polarization state components when a data signal is transmitted in a fiber.

Figure 7:
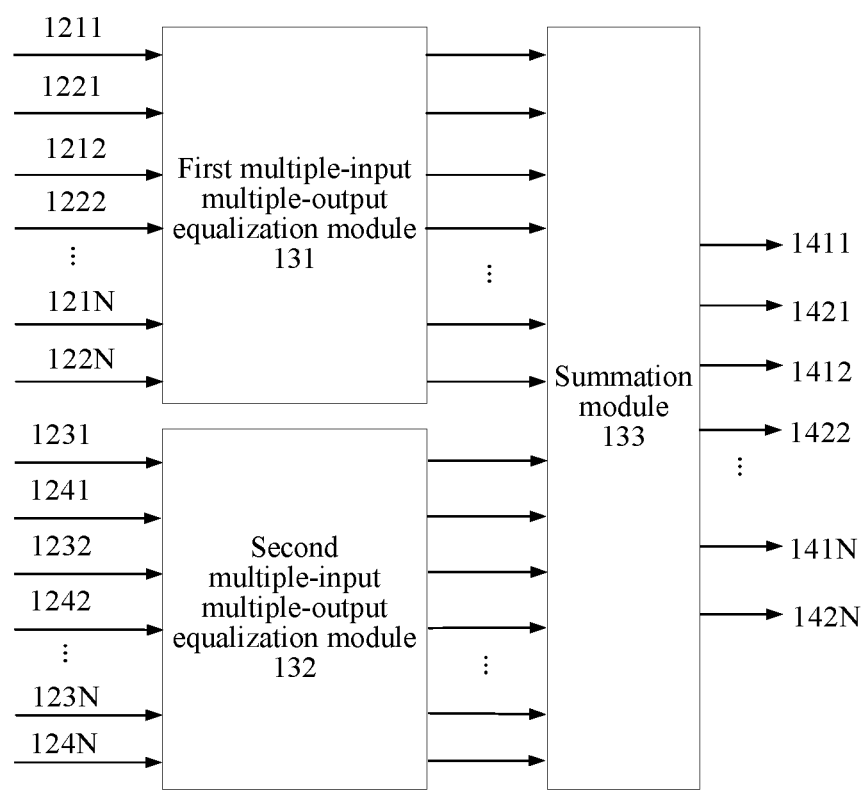
FIG. 7 is a schematic structural diagram of one embodiment of a multiple-input multiple-output equalization module of a receiver according to the present invention.

FIG. 7 is a schematic structural diagram of Embodiment 1 of a multiple-input multiple-output equalization module of a receiver according to the present invention. As shown in FIG. 7, the multiple-input multiple-output equalization module in this embodiment is based on the structure of the receiver in any one of FIG. 2 to FIG. 6. Further, the multiple-input multiple-output equalization module 13 may specifically include a first multiple-input multiple-output equalization module 131, a second multiple-input multiple-output equalization module 132, and a summation module 133. The first multiple-input multiple-output equalization module 131 is connected to the 2N output ends of the first despreading module 123, and the second multiple-input multiple-output equalization module 132 is connected to the 2N output ends of the second despreading module 124. The first multiple-input multiple-output equalization module 131 includes 2N third output ends. The second multiple-input multiple-output equalization module 132 includes 2N fourth output ends. The 2N third output ends and the 2N fourth output ends are connected to the summation module 133. The summation module is connected to the 2N first output ends. The first multiple-input multiple-output equalization module 131 is configured to process the N first baseband signals based on 2N*2N filtering coefficients, to obtain first modulation data of the N transmitters, where the first modulation data of each transmitter includes first modulation data of the first polarization state and first modulation data of the second polarization state of the transmitter. The second multiple-input multiple-output equalization module 132 is configured to process the N second baseband signals based on the 2N*2N filtering coefficients, to obtain second modulation data of the N transmitters, where the second modulation data of each transmitter includes second modulation data of the first polarization state and second modulation data of the second polarization state of the transmitter. The summation module 133 is configured to sum the first modulation data and the second modulation data of the N transmitters up, to obtain the recovered data of the first polarization states and the recovered data of the second polarization states of the N transmitters.

In other words, in this embodiment, the receiver respectively compensates, for a channel loss by using two multiple-input multiple-output equalization modules, the first baseband signals and the second baseband signals that are obtained through despreading, thereby effectively compensating for a DGD loss on a fiber channel, and further, improving data transmission performance.

Figure 8:
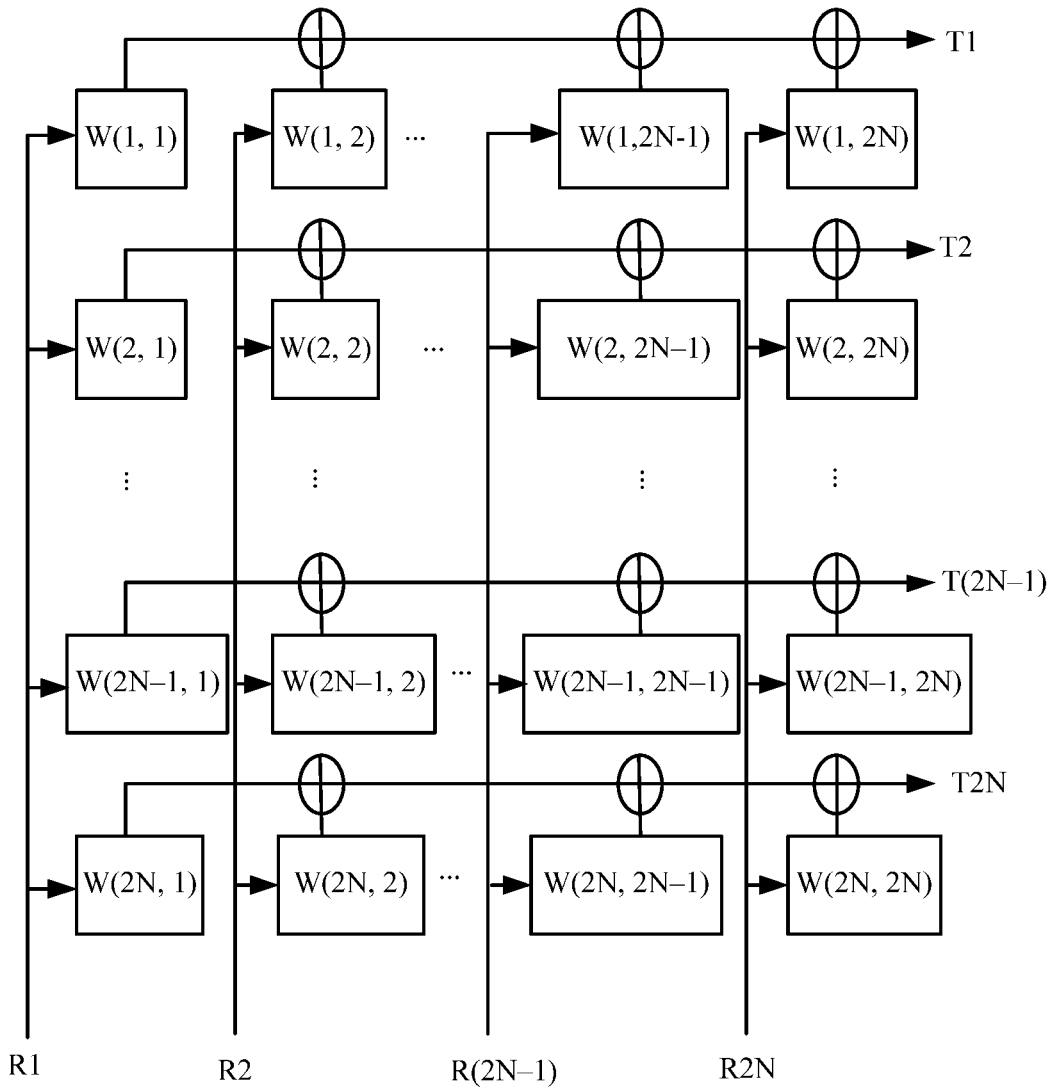
FIG. 8 is a schematic structural diagram of a first multiple-input multiple-output equalization module or a second multiple-input multiple-output equalization module of a receiver according to the present invention.

FIG. 8 is a schematic structural diagram of a first multiple-input multiple-output equalization module or a second multiple-input multiple-output equalization module of a receiver according to the present invention. As shown in FIG. 8, in this embodiment, the first multiple-input multiple-output equalization module and the second multiple-input multiple-output equalization module are based on the structure of the receiver shown in FIG. 7. Further, the first multiple-input multiple-output equalization module may specifically include 2N*2N first equalization submodules. One filtering coefficient is set for each first equalization submodule. As shown in FIG. 8, filtering coefficients of first equalization submodules in the first row are $W(1, 1)$, $W(1, 2)$, ..., $W(1, 2N-1)$, and $W(1, 2N)$; and the 2N columns of first equalization submodules are separately connected to one output end of the first despreading module. As shown in FIG. 8, an input end (R1, R2, ..., R(2N-1), or R2N) in each column is connected to one output end of the first despreading module. For example, R1 is connected to 1211, and R2 is connected to 1221. The 2N rows of first equalization submodules are separately connected to one third output end by using 2N-1 adders. As shown in FIG. 8, an output end (T1, T2, ..., T(2N-1), or T2N) in each row is connected to one third output end. The second multiple-input multiple-output equalization module specifically includes 2N*2N second equalization submodules. One filtering coefficient is set for each second equalization submodule. The 2N rows of second equalization submodules are separately connected to one output end of the second despreading module. The 2N columns of second equalization submodules are separately connected to one fourth output end by using the 2N-1 adders.

In other words, a same connection structure may be used for the first multiple-input multiple-output equalization module and the second multiple-input multiple-output equalization module. Filtering coefficients of the first equalization submodule and the second equalization submodule may be set to different values.

Figure 9:
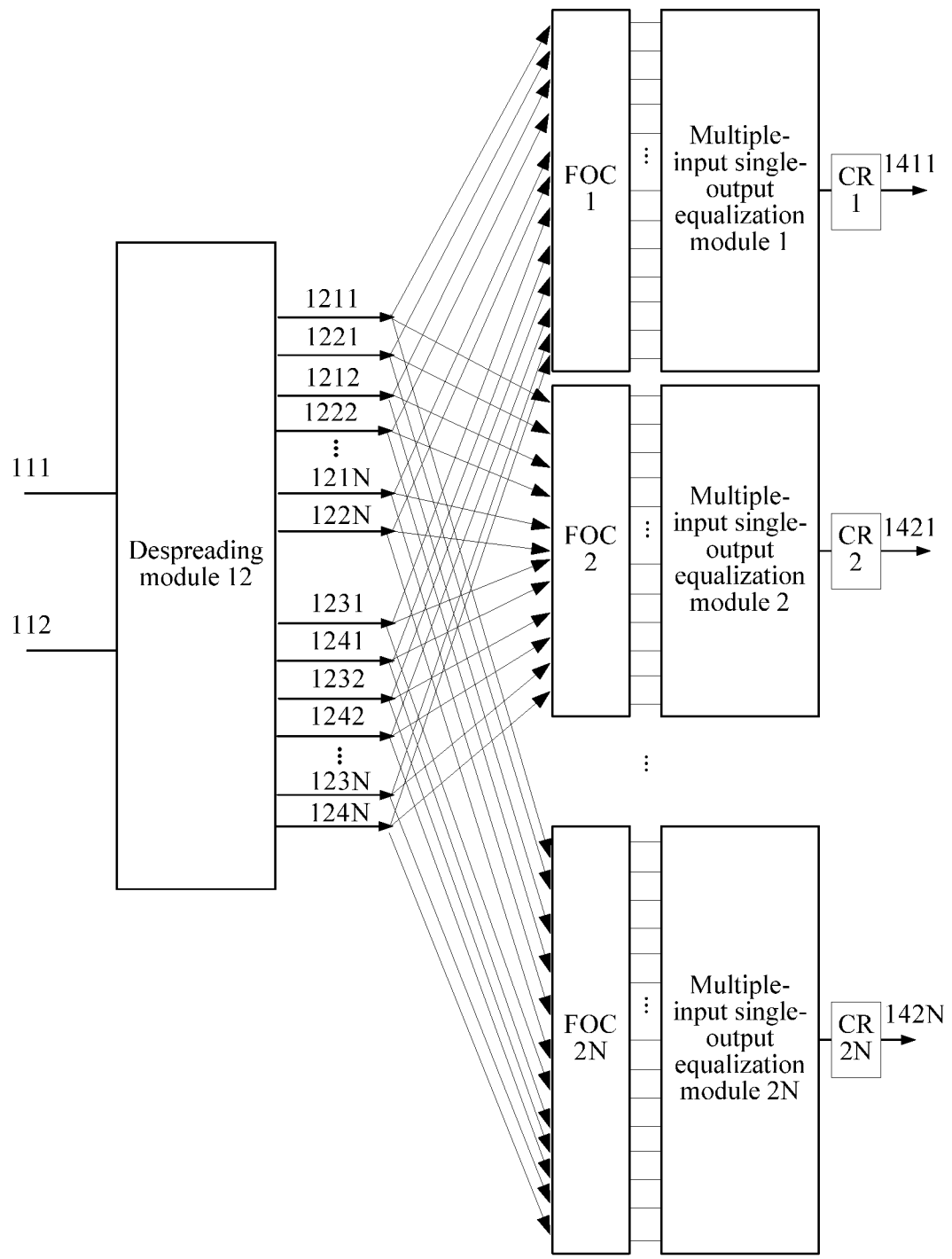
FIG. 9 is a schematic structural diagram of Embodiment 6 of a receiver according to the present invention.

FIG. 9 is a schematic structural diagram of one embodiment of a receiver according to the present invention. As shown in FIG. 9, the receiver in this embodiment is based on the structure of the receiver shown in any one of FIG. 2 to FIG. 6. Further, the multiple-input multiple-output equalization module 13 may specifically include 2N Multiple-input single-output equalization modules. Each Multiple-input single-output equalization module is connected to the 2N output ends of the first despreading module and the 2N output ends of the second despreading module. The 2N Multiple-input single-output equalization modules process the N first baseband signals and the N second baseband signals each by using one transmitter as a reference, to obtain recovered data of one polarization state of a corresponding transmitter.

In one embodiment, the receiver may further include 2N carrier recovery modules, the 2N carrier recovery modules each are disposed at one first output end, and each carrier recovery module is configured to perform carrier phase recovery on recovered data of a transmitter corresponding to the carrier recovery module, to obtain original data of a polarization state of the transmitter corresponding to the carrier recovery module.

In this embodiment, after despreading the to-be-processed digital signals to obtain the N first baseband signals and the N second baseband signals, the receiver respectively inputs the N first baseband signals and the N second baseband signals to the 2N Multiple-input single-output equalization modules. The 2N Multiple-input single-output equalization modules process the N first baseband signals and the N second baseband signals each by using one transmitter as a reference, to obtain recovered data of one polarization state of a corresponding transmitter. For example, to demodulate original data of a first polarization state of a transmitter 1, a despread digital signal first enters a carrier frequency offset compensation module FOC 1, to perform frequency offset compensation on each signal; then, enters a Multiple-input single-output equalization module 1, to output a single signal; and finally, enters a carrier phase recovery module CR 1, to perform carrier phase recovery the signal to recover the original data of the first polarization state of the transmitter 1. Similarly, another Multiple-input single-output module is configured to demodulate original data of a first polarization state or a second polarization state of another transmitter.

In this embodiment, the receiver compensates, for a channel loss by using 2N Multiple-input single-output equalization modules, the first baseband signals and the second baseband signals respectively that are obtained through despreading, thereby effectively compensating for a DGD loss on a fiber channel, and further, improving data transmission performance. This embodiment is more applicable to an application scenario in which a frequency offset between transmitters is relatively large.

Figure 10:
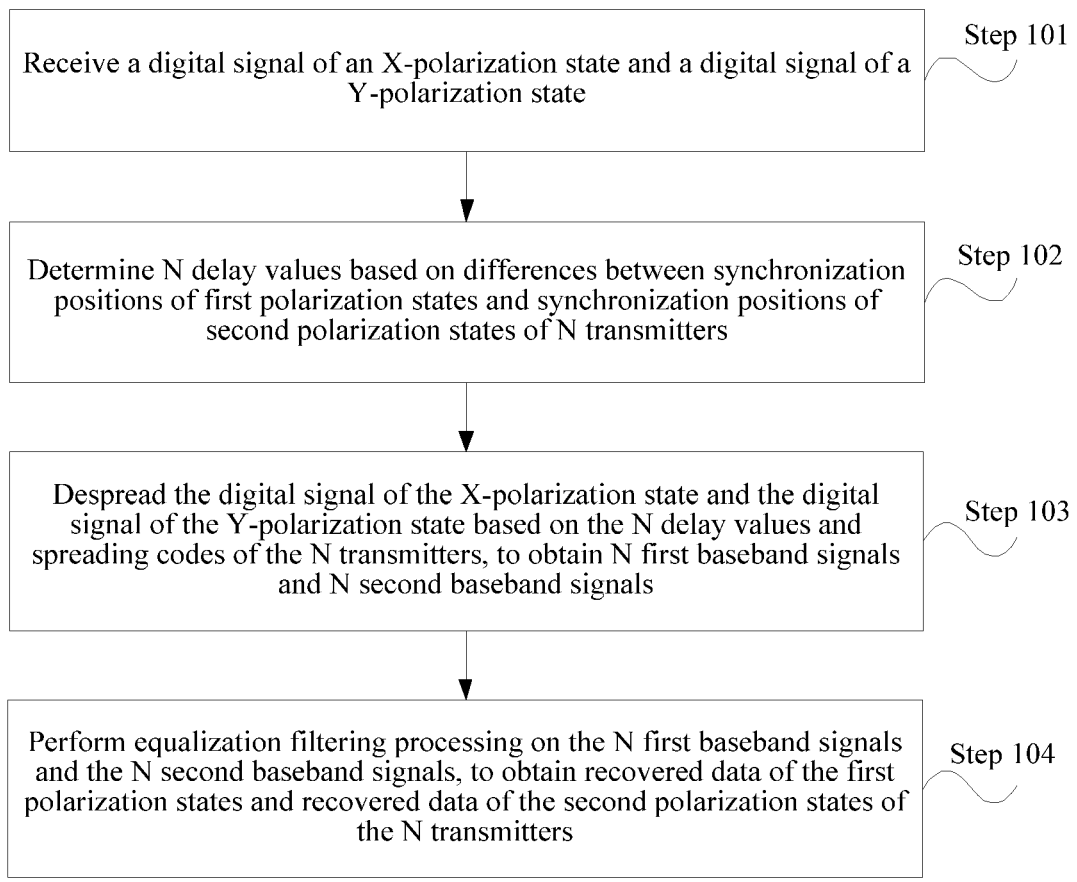
FIG. 10 is a flowchart of one embodiment of a data receiving method according to the present invention.

FIG. 10 is a flowchart of one embodiment of a data receiving method according to the present invention. As shown in FIG. 10, the method in this embodiment may include the following operations:

In operation 101, a digital signal of an X-polarization state and a digital signal of a Y-polarization state are received.

In operation 102, N delay values based on differences between synchronization positions of first polarization states and synchronization positions of second polarization states of N transmitters are determined.

In operation 103, the digital signal of the X-polarization state and the digital signal of the Y-polarization state based on the N delay values and spreading codes of the N transmitters are despread, to obtain N first baseband signals and N second baseband signals.

Each first baseband signal includes a first baseband signal of the X-polarization state and a first baseband signal of the Y-polarization state, and each second baseband signal includes a second baseband signal of the X-polarization state and a second baseband signal of the Y-polarization state.

In operation 104, equalization filtering processing on the N first baseband signals and the N second baseband signals are performed, to obtain recovered data of the first polarization states and recovered data of the second polarization states of the N transmitters.

A value of N is the same as a quantity of transmitters.

In an implementable manner, operation 103 of despreading the digital signal of the X-polarization state and the digital signal of the Y-polarization state based on the N delay values and the spreading codes of the N transmitters, to obtain the N first baseband signals and the N second baseband signals may specifically include: separately despreading the digital signal of the X-polarization state and the digital signal of the Y-polarization state by using the spreading codes of the N transmitters, to obtain the N second baseband signals; performing delay processing on the digital signal of the X-polarization state and the digital signal of the Y-polarization state based on the N delay values, to obtain N delayed digital signals of the X-polarization state and N delayed digital signals of the Y-polarization state; and separately despreading the N delayed digital signals of the X-polarization state and the N delayed digital signals of the Y-polarization state by using the spreading codes of the N transmitters, to obtain the N first baseband signals.

In another implementable manner, operation 103 of despreading the digital signal of the X-polarization state and the digital signal of the Y-polarization state based on the N delay values and the spreading codes of the N transmitters, to obtain the N first baseband signals and the N second baseband signals may specifically include: separately despreading the digital signal of the X-polarization state and the digital signal of the Y-polarization state by using the spreading codes of the N transmitters, to obtain the N first baseband signals; performing delay processing on the digital signal of the X-polarization state and the digital signal of the Y-polarization state based on the N delay values, to obtain N delayed digital signals of the X-polarization state and N delayed digital signals of the Y-polarization state; and separately despreading the N delayed digital signals of the X-polarization state and the N delayed digital signals of the Y-polarization state by using the spreading codes of the N transmitters, to obtain the N second baseband signals.

In still another implementable manner, operation 103 of despreading the digital signal of the X-polarization state and the digital signal of the Y-polarization state based on the N delay values and the spreading codes of the N transmitters, to obtain the N first baseband signals and the N second baseband signals may specifically include: separately despreading the digital signal of the X-polarization state and the digital signal of the Y-polarization state by using the spreading codes of the N transmitters, to obtain the N second baseband signals; performing delay processing on the spreading codes of the N transmitters based on the N delay values, to obtain N delayed spreading codes; and separately despreading the digital signal of the X-polarization state and the digital signal of the Y-polarization state by using the N delayed spreading codes, to obtain the N first baseband signals.

In yet another implementable manner, operation 103 of despreading the digital signal of the X-polarization state and the digital signal of the Y-polarization state based on the N delay values and the spreading codes of the N transmitters, to obtain the N first baseband signals and the N second baseband signals may specifically include: separately despreading the digital signal of the X-polarization state and the digital signal of the Y-polarization state by using the spreading codes of the N transmitters, to obtain the N first baseband signals; performing delay processing on the spreading codes of the N transmitters based on the N delay values, to obtain N delayed spreading codes; and separately despreading the digital signal of the X-polarization state and the digital signal of the Y-polarization state by using the N delayed spreading codes, to obtain the N second baseband signals.

In one embodiment, the method may further include: determining the synchronization positions of the first polarization states of the N transmitters based on training sequences of the first polarization states of the N transmitters, the digital signal of the X-polarization state, and the digital signal of the Y-polarization state; and determining the synchronization positions of the second polarization states of the N transmitters based on training sequences of the second polarization states of the N transmitters, the digital signal of the X-polarization state, and the digital signal of the Y-polarization state.

In one embodiment, the performing equalization filtering processing on the N first baseband signals and the N second baseband signals, to obtain recovered data of the first polarization states and recovered data of the second polarization states of the N transmitters may specifically include: processing the N first baseband signals based on 2N*2N filtering coefficients, to obtain first modulation data of the N transmitters, where the first modulation data of each transmitter includes first modulation data of the first polarization state and first modulation data of the second polarization state of the transmitter; processing the N second baseband signals based on the 2N*2N filtering coefficients, to obtain second modulation data of the N transmitters, where the second modulation data of each transmitter includes second modulation data of the first polarization state and second modulation data of the second polarization state of the transmitter; and summing the first modulation data and the second modulation data of the N transmitters up, to obtain the recovered data of the first polarization states and the recovered data of the second polarization states of the N transmitters.

In this embodiment, the digital signal of the X-polarization state and the digital signal of the Y-polarization state are received; and the digital signal of the X-polarization state and the digital signal of the Y-polarization state are despread based on the delay values of the N transmitters and the spreading codes of the N transmitters, to obtain the N first baseband signals and the N second baseband signals. The delay values of the N transmitters are separately determined based on the differences between the synchronization positions of the first polarization states and the synchronization positions of the second polarization states of the N transmitters. Further, equalization filtering processing is performed on the N first baseband signals and the N second baseband signals, to obtain the recovered data of the first polarization states and the recovered data of the second polarization states of the N transmitters, that is, a received to-be-processed digital signal is synchronized and despread based on the first polarization state and the second polarization state of each transmitter. Further, recovered data of first polarization states and recovered data of second polarization states of different transmitters are obtained, thereby implementing receiving of data of dual polarization states of a plurality of transmitters, that is, implementing coherent CDMA multipoint-to-point data transmission in an optical communications system. In addition, in a process of obtaining data of the first polarization states and the second polarization states of the different transmitters, a DGD effect on a fiber channel can be effectively compensated for, thereby effectively improving data transmission quality.

It should be noted that functional modules of the receiver in the foregoing embodiments of the present invention may correspond to one or more processors of the receiver. The functional modules may include the despreading module 12, the multiple-input multiple-output equalization module 13, the first despreading module 123, the second despreading module 124, the first polarization state synchronization module 125, the second polarization state synchronization module 125, the adjustable delay modules (1271 and 1272), the first despreading submodule, the second despreading submodule, the Multiple-input single-output equalization module, and the like in the foregoing embodiments. Input ends and output ends of the functional modules may correspond to ports of the processors. The processors herein may be a central processing unit (Central Processing Unit, CPU), or an application-specific integrated circuit (Application Specific Integrated Circuit, ASIC), or one or more integrated circuits for implementing the embodiments of the present invention. It may be understood that the receiver may further include a receiver, a transmitter, and a memory. The memory is configured to store instruction code. The processor invokes the instruction code in the memory, and controls the receiver and the transmitter, so that the receiver performs the foregoing operations.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform some of the operations of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A receiver, comprising:
two first input ends;
a despreading module;
a multiple-input multiple-output equalization module; and
2N first output ends;
wherein the two first input ends are connected to the despreading module, and
are configured to respectively receive a digital signal of an X-polarization state and a digital signal of a Y-polarization state;
wherein the despreading module is connected to the multiple-input multiple-output equalization module, and is configured to despread the digital signal of the X-polarization state and the digital signal of the Y-polarization state based on N delay values and spreading codes of N transmitters, to obtain N first baseband signals and N second baseband signals;
wherein each of the N first baseband signal comprises a first baseband signal of the X-polarization state and a first baseband signal of the Y-polarization state;
wherein each of the N second baseband signal comprises a second baseband signal of the X-polarization state and a second baseband signal of the Y-polarization state;
wherein the N delay values are respectively determined based on differences between synchronization positions of first polarization states and synchronization positions of second polarization states of the N transmitters;
wherein the multiple-input multiple-output equalization module is configured to perform equalization filtering processing on the N first baseband signals and the N second baseband signals, to obtain recovered data of the first polarization states and recovered data of the second polarization states of the N transmitters; and
wherein the 2N first output ends each are configured to output recovered data of one polarization state of one transmitter, N being a positive integer greater than or equal to 1.

2. The receiver according to claim 1, wherein the despreading module comprises a first despreading module and a second despreading module, and wherein the first despreading module and the second despreading module each comprise two input ends and 2N output ends;
wherein the two input ends of the first despreading module and the two input ends of the second despreading module are separately connected to the two first input ends;
wherein the 2N output ends of the first despreading module and the 2N output ends of the second despreading module are separately connected to one second output end;
wherein the first despreading module is configured to output the N first baseband signals, and the second despreading module is configured to output the N second baseband signals; and
wherein one output end of the first despreading module is configured to output a first baseband signal of the X-polarization state of one transmitter or a first baseband signal of the Y-polarization state of one transmitter, and one output end of the second despreading module is configured to output a second baseband signal of the X-polarization state of one transmitter or a second baseband signal of the Y-polarization state of one transmitter.

3. The receiver according to claim 2, wherein the despreading module further comprises a first polarization state synchronization module and a second polarization state synchronization module;
wherein the first polarization state synchronization module is configured to determine the synchronization positions of the first polarization states of the N transmitters based on training sequences of the first polarization states of the N transmitters, the digital signal of the X-polarization state, and the digital signal of the Y-polarization state; and
wherein the second polarization state synchronization module is configured to determine the synchronization positions of the second polarization states of the N transmitters based on training sequences of the second polarization states of the N transmitters, the digital signal of the X-polarization state, and the digital signal of the Y-polarization state.

4. The receiver according to claim 3, wherein the despreading module further comprises an adjustable delay module, wherein the adjustable delay module is disposed between the two first input ends and the first despreading module, and wherein the adjustable delay module is further connected to the first polarization state synchronization module and the second polarization state synchronization module;
wherein the adjustable delay module is configured to:
determine delay values of the N transmitters based on the differences between the synchronization positions of the first polarization states of the N transmitters and the synchronization positions of the second polarization states of the N transmitters, perform delay processing on the digital signal of the X-polarization state and the digital signal of the Y-polarization state separately based on the delay values of the N transmitters to obtain N delayed digital signals of the X-polarization state and N delayed digital signals of the Y-polarization state, and output the N delayed digital signals of the X-polarization state and the N delayed digital signals of the Y-polarization state to the first despreading module; and
wherein the first despreading module separately despreads the N delayed digital signals of the X-polarization state and the N delayed digital signals of the Y-polarization state by using the spreading codes of the N transmitters, to obtain the N first baseband signals.

5. The receiver according to claim 3, wherein the despreading module further comprises an adjustable delay module, wherein the adjustable delay module is disposed between the two first input ends and the second despreading module, and wherein the adjustable delay module is further connected to the first polarization state synchronization module and the second polarization state synchronization module;
wherein the adjustable delay module is configured to:
determine delay values of the N transmitters based on the differences between the synchronization positions of the first polarization states of the N transmitters and the synchronization positions of the second polarization states of the N transmitters, respectively perform delay processing on the digital signal of the X-polarization state and the digital signal of the Y-polarization state based on the delay values of the N transmitters to obtain N delayed digital signals of the X-polarization state and N delayed digital signals of the Y-polarization state, and output the N delayed digital signals of the X-polarization state and the N delayed digital signals of the Y-polarization state to the second despreading module; and wherein the second despreading module respectively despreads the N delayed digital signals of the X-polarization state and the N delayed digital signals of the Y-polarization state by using the spreading codes of the N transmitters, to obtain the N second baseband signals.

6. The receiver according to claim 3, wherein the despreading module further comprises N adjustable delay modules, wherein the first despreading module comprises N first despreading submodules, wherein the N adjustable delay modules each are disposed in one first despreading submodule, and wherein one of the first N despreading submodule is configured to output a first baseband signal of the X-polarization state and a first baseband signal of the Y-polarization state of one transmitter;

wherein each of the N adjustable delay module determines a delay value of one transmitter based on a difference between a synchronization position of a first polarization state of the transmitter and a synchronization position of a second polarization state of the transmitter, performs delay processing on a spreading code of the transmitter based on the delay value of the transmitter to obtain a delayed spreading code of the transmitter, and outputs the delayed spreading code of the transmitter to a first despreading submodule corresponding to the spreading code; and wherein each first N despreading submodule is configured to despread the digital signal of the X-polarization state and the digital signal of the Y-polarization state by using a delayed spreading code of a transmitter, to obtain a first baseband signal.

7. The receiver according to claim 3, wherein the despreading module further comprises N adjustable delay modules, wherein the second despreading module comprises N second despreading submodules, wherein the N adjustable delay modules each are disposed in one second despreading submodule, and wherein one of the N second despreading submodule is configured to output a second baseband signal of the X-polarization state and a second baseband signal of the Y-polarization state of one transmitter;

wherein each of the N adjustable delay module determines a delay value of one transmitter based on a difference between a synchronization position of a first polarization state of the transmitter and a synchronization position of a second polarization state of the transmitter, performs delay processing on a spreading code of the transmitter based on the delay value of the transmitter to obtain a delayed spreading code of the transmitter, and outputs the delayed spreading code of the transmitter to a second despreading submodule corresponding to the spreading code; and wherein each of the N second despreading submodule is configured to despread the digital signal of the X-polarization state and the digital signal of the Y-polarization state by using a delayed spreading code of one transmitter, to obtain one second baseband signal.

8. The receiver according to claim 2, wherein the multiple-input multiple-output equalization module comprises a first multiple-input multiple-output equalization module, a second multiple-input multiple-output equalization module, and a summation module;

wherein the first multiple-input multiple-output equalization module is connected to the 2N output ends of the first despreading module, and the second multiple-input multiple-output equalization module is connected to the 2N output ends of the second despreading module;

wherein the first multiple-input multiple-output equalization module comprises 2N third output ends;

wherein and the second multiple-input multiple-output equalization module comprises 2N fourth output ends;

wherein the 2N third output ends are connected to the 2N fourth output ends and the summation module;

wherein the summation module is connected to the 2N first output ends;

wherein the first multiple-input multiple-output equalization module is configured to process the N first baseband signals based on 2N*2N filtering coefficients, to obtain first modulation data of the N transmitters, wherein the first modulation data of each transmitter comprises first modulation data of the first polarization state and first modulation data of the second polarization state of the transmitter;

wherein the second multiple-input multiple-output equalization module is configured to process the N second baseband signals based on the 2N*2N filtering coefficients, to obtain second modulation data of the N transmitters, wherein the second modulation data of each transmitter comprises second modulation data of the first polarization state and second modulation data of the second polarization state of the transmitter; and wherein the summation module is configured to sum the first modulation data and the second modulation data of the N transmitters up, to obtain the recovered data of the first polarization states and the recovered data of the second polarization states of the N transmitters.

9. The receiver according to claim 8, wherein the first multiple-input multiple-output equalization module comprises 2N*2N first equalization submodules, and wherein one filtering coefficient is set for each first equalization submodule;

wherein 2N columns of first equalization submodules are separately connected to one output end of the first despreading module;

wherein 2N rows of first equalization submodules are separately connected to one third output end by using 2N−1 adders;

wherein the second multiple-input multiple-output equalization module comprises 2N*2N second equalization submodules;

wherein one filtering coefficient is set for each second equalization submodule; and wherein 2N columns of second equalization submodules are separately connected to one output end of the second despreading module, and 2N rows of second equalization submodules are separately connected to one fourth output end by using the 2N−1 adders.

10. The receiver according to claim 2, wherein the multiple-input multiple-output equalization module comprises 2N Multiple-input single-output equalization modules;

wherein each of the 2N Multiple-input single-output equalization module is connected to the 2N output ends of the first despreading module and the 2N output ends of the second despreading module; and wherein the 2N Multiple-input single-output equalization modules process the N first baseband signals and the N second baseband signals each by using one transmitter as a reference, to obtain recovered data of one polarization state of a corresponding transmitter.

11. The receiver according to claim 1, wherein the receiver further comprises 2N carrier recovery modules, the 2N carrier recovery modules each are disposed at one first output end, and each carrier recovery module is configured to perform carrier phase recovery on recovered data of one polarization state of a transmitter corresponding to the carrier recovery module, to obtain original data of the polarization state of the transmitter corresponding to the carrier recovery module.

12. A data receiving method, comprising:
   receiving a digital signal of an X-polarization state and a digital signal of a Y-polarization state;
   determining N delay values based on differences between synchronization positions of first polarization states and synchronization positions of second polarization states of N transmitters;
   despreading the digital signal of the X-polarization state and the digital signal of the Y-polarization state based on the N delay values and spreading codes of the N transmitters, to obtain N first baseband signals and N second baseband signals, wherein each first baseband signal comprises a first baseband signal of the X-polarization state and a first baseband signal of the Y-polarization state, and wherein each second baseband signal comprises a second baseband signal of the X-polarization state and a second baseband signal of the Y-polarization state, wherein the despreading the digital signal of the X-polarization state and the digital signal of the Y-polarization state based on the N delay values and spreading codes of the N transmitters, to obtain N first baseband signals and N second baseband signals comprises:
      despreading the digital signal of the X-polarization state and the digital signal of the Y-polarization state separately by using the spreading codes of the N transmitters, to obtain the N second baseband signals,
      performing delay processing on the digital signal of the X-polarization state and the digital signal of the Y-polarization state based on the N delay values, to obtain N delayed digital signals of the X-polarization state and N delayed digital signals of the Y-polarization state, and
      respectively despreading the N delayed digital signals of the X-polarization state and the N delayed digital signals of the Y-polarization state by using the spreading codes of the N transmitters, to obtain the N first baseband signals; and
   performing equalization filtering processing on the N first baseband signals and the N second baseband signals, to obtain recovered data of the first polarization states and recovered data of the second polarization states of the N transmitters, wherein a value of N is the same as a quantity of transmitters.

13. The method according to claim 12, wherein the despreading the digital signal of the X-polarization state and the digital signal of the Y-polarization state based on the N delay values and spreading codes of the N transmitters, to obtain N first baseband signals and N second baseband signals comprises:
   despreading the digital signal of the X-polarization state and the digital signal of the Y-polarization state separately by using the spreading codes of the N transmitters, to obtain the N first baseband signals;
   performing delay processing on the digital signal of the X-polarization state and the digital signal of the Y-polarization state based on the N delay values, to obtain N delayed digital signals of the X-polarization state and N delayed digital signals of the Y-polarization state; and
   respectively despreading the N delayed digital signals of the X-polarization state and the N delayed digital signals of the Y-polarization state by using the spreading codes of the N transmitters, to obtain the N second baseband signals.

14. The method according to claim 12, wherein the despreading the digital signal of the X-polarization state and the digital signal of the Y-polarization state based on the N delay values and spreading codes of the N transmitters, to obtain N first baseband signals and N second baseband signals comprises:
   despreading the digital signal of the X-polarization state and the digital signal of the Y-polarization state separately by using the spreading codes of the N transmitters, to obtain the N second baseband signals;
   performing delay processing on the spreading codes of the N transmitters based on the N delay values, to obtain N delayed spreading codes; and
   despreading the digital signal of the X-polarization state and the digital signal of the Y-polarization state by using the N delayed spreading codes, to obtain the N first baseband signals.

15. The method according to claim 12, wherein the despreading the digital signal of the X-polarization state and the digital signal of the Y-polarization state based on the N delay values and spreading codes of the N transmitters, to obtain N first baseband signals and N second baseband signals comprises:
   despreading the digital signal of the X-polarization state and the digital signal of the Y-polarization state separately by using the spreading codes of the N transmitters, to obtain the N first baseband signals;
   performing delay processing on the spreading codes of the N transmitters based on the N delay values, to obtain N delayed spreading codes; and
   despreading the digital signal of the X-polarization state and the digital signal of the Y-polarization state separately by using the N delayed spreading codes, to obtain the N second baseband signals.

16. The method according to claim 12, further comprising:
   determining the synchronization positions of the first polarization states of the N transmitters based on training sequences of the first polarization states of the N transmitters, the digital signal of the X-polarization state, and the digital signal of the Y-polarization state; and
   determining the synchronization positions of the second polarization states of the N transmitters based on training sequences of the second polarization states of the N transmitters, the digital signal of the X-polarization state, and the digital signal of the Y-polarization state.

17. The method according to claim 12, wherein the performing equalization filtering processing on the N first baseband signals and the N second baseband signals, to obtain recovered data of the first polarization states and recovered data of the second polarization states of the N transmitters comprises:
   processing the N first baseband signals based on 2N*2N filtering coefficients, to obtain first modulation data of the N transmitters, wherein the first modulation data of each transmitter comprises first modulation data of the first polarization state and first modulation data of the second polarization state of the transmitter;
   processing the N second baseband signals based on the 2N*2N filtering coefficients, to obtain second modulation data of the N transmitters, wherein the second modulation data of each transmitter comprises second modulation data of the first polarization state and second modulation data of the second polarization state of the transmitter; and summing the first modulation data and the second modulation data of the N transmitters up, to obtain the recovered data of the first polarization state and the recovered data of the second polarization state of the N transmitters.

* * * * *